(12) United States Patent
Bodas et al.

(10) Patent No.: US 9,788,258 B2
(45) Date of Patent: Oct. 10, 2017

(54) PULL-BASED RELAY SELECTION FOR DEVICE-TO-DEVICE COMMUNICATION

(71) Applicant: QUALCOMM Incorporated, San Diego, CA (US)

(72) Inventors: Shreeshankar Ravishankar Bodas, Belle Mead, NJ (US); Hua Wang, Basking Ridge, NJ (US); Junyi Li, Chester, NJ (US)

( * ) Notice: Subject to any disclaimer, the term of this patent is extended or adjusted under 35 U.S.C. 154(b) by 147 days.

(21) Appl. No.: 14/717,862

(22) Filed: May 20, 2015

(65) Prior Publication Data

US 2016/0262086 A1 Sep. 8, 2016

Related U.S. Application Data

(60) Provisional application No. 62/127,623, filed on Mar. 3, 2015.

(51) Int. Cl.
| | |
|---|---|
| H04B 7/14 | (2006.01) |
| H04W 40/24 | (2009.01) |
| H04B 7/15 | (2006.01) |
| H04W 8/00 | (2009.01) |
| H04W 28/02 | (2009.01) |
| H04W 76/02 | (2009.01) |
| H04W 40/22 | (2009.01) |

(Continued)

(52) U.S. Cl.
CPC ............ *H04W 40/248* (2013.01); *H04B 7/15* (2013.01); *H04W 8/005* (2013.01); *H04W 28/0215* (2013.01); *H04W 40/22* (2013.01); *H04W 40/244* (2013.01); *H04W 40/246* (2013.01); *H04W 76/023* (2013.01); *H04W 40/08* (2013.01); *H04W 88/04* (2013.01)

(58) Field of Classification Search
None
See application file for complete search history.

(56) References Cited

U.S. PATENT DOCUMENTS 9,155,002 B2 * 10/2015 Jang .................... H04W 76/043
2011/0255462 A1 10/2011 Jo et al.

(Continued)

FOREIGN PATENT DOCUMENTS

WO WO-2014138523 A1 9/2014

OTHER PUBLICATIONS

ISA/EPO, International Search Report and Written Opinion of the International Searching Authority, Int'l. App. No. PCT/US2016/018849, dated May 3, 2016, European Patent Office, Rijswijk, NL, 11 pgs.

(Continued)

*Primary Examiner* — Michael J Moore, Jr.
(74) *Attorney, Agent, or Firm* — Qualcomm IP Dept.; James Hunt Yancey, Jr.

(57) ABSTRACT

Techniques are described for wireless communication. One method includes transmitting, from a first communication device, a relay search query to a plurality of relay candidates; receiving a relay search query response indicating a relay that provides at least a threshold device-to-relay-to-device (DRD) capacity for communications between the first communication device and a second communication device; and communicating with the second communication device through the indicated relay based at least in part on the relay search query response.

28 Claims, 14 Drawing Sheets

(51) Int. Cl.
   *H04W 88/04*    (2009.01)
   *H04W 40/08*    (2009.01)

(56) References Cited

U.S. PATENT DOCUMENTS

| | | |
|---|---|---|
| 2012/0239821 A1 | 9/2012 | Hozumi |
| 2014/0044036 A1 | 2/2014 | Kim et al. |
| 2014/0154970 A1 | 6/2014 | Long et al. |
| 2014/0171062 A1* | 6/2014 | Fallgren ................ H04W 40/22 455/422.1 |
| 2016/0157182 A1* | 6/2016 | Izawa ................ H04W 52/143 455/522 |
| 2017/0048896 A1* | 2/2017 | Ayadurai .............. H04W 76/02 |

OTHER PUBLICATIONS

Ma et al., "A Distributed Relay Selection Method for Relay Assisted Device-to-Device Communication System," 2012 IEEE 23rd International Symposium on Personal, Indoor and Mobile Radio Communications—(PIMRC), Sydney, NSW, Sep. 9-12, 2012, pp. 1020-1024, XP_32272687A, Institute of Electrical and Electronics Engineers.

Wen S., et al., "Achievable Transmission Capacity of Relay-Assisted Device-to-Device (D2D) Communication Underlay Cellular Networks," IEEE 78th Vehicular Technology Conference (VTC Fall), 2013, pp. 1-5.

* cited by examiner

PULL-BASED RELAY SELECTION FOR DEVICE-TO-DEVICE COMMUNICATION

CROSS REFERENCES

The present application for patent claims priority to U.S. Provisional Patent Application No. 62/127,623 by Bodas et al., entitled "PULL-Based Relay Selection for Device-to-Device Communication," filed Mar. 3, 2015, assigned to the assignee hereof, and expressly incorporated by reference herein.

BACKGROUND

Field of the Disclosure

The present disclosure, for example, relates to wireless communication systems, and more particularly to the selection of a relay for device-to-device (D2D) communication.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from the base station to the UEs) and uplink channels (e.g., for transmissions from the UEs to the base station). A wireless multiple-access communication system may also, or alternatively, support D2D communication between communication devices (e.g., between UEs). D2D communications may involve wireless communications directly between communication devices (e.g., directly between UEs, without the communications passing through one or more base stations).

D2D communications may sometimes be relayed through one or more intermediary communication devices (e.g., through one or more relays). A relay may take the form of a dedicated relay device or be part of another device. In some cases, multiple candidate relays may be available between two endpoint devices, but not all relay candidates may provide the same advantages, and some relay candidates may not provide any advantage. There may be no way for the endpoint devices to identify which of the candidate relays would provide the best service between the two endpoint devices, and the selection of a relay device may be unnecessarily arbitrary.

SUMMARY

The present disclosure generally relates to one or more improved systems, methods, and/or apparatuses for selecting a relay for device-to-device (D2D) communication. According to various examples, a first communication device may select a relay for communication with a second communication device to improve communication with the second communication device (e.g., to achieve a higher data rate, lower latency, range extension, etc.). However, not all relay candidates may provide the same advantages, and some relay candidates may not provide any advantage. In this regard, a PULL-based relay selection process and related control signaling are described in the present disclosure.

In accordance with a PULL-based relay selection process, a plurality of communication devices may periodically transmit beacons announcing their availability. Each of a plurality of relays may then estimate a pathloss, from each of the communication devices to the relay, to generate a capacity estimate for the relay for each of the plurality of communication devices. Each relay may also generate a device-to-relay-to-device (DRD) capacity estimate for each known or potential pair of source and destination communication devices. A source and destination communication device communicating (or desiring to communicate) using D2D communication may then select a relay, from among the plurality of relay candidates, by transmitting one or more relay search queries to the plurality of relays (i.e., relay candidates) and selecting a relay based at least in part on the DRD capacity estimates of the relays.

In a first set of illustrative examples, a method for wireless communication is described. In one configuration, the method may include transmitting, from a first communication device, a relay search query to a plurality of relay candidates; receiving a relay search query response indicating a relay that provides at least a threshold DRD capacity for communications between the first communication device and a second communication device; and communicating with the second communication device through the indicated relay based at least in part on the relay search query response. In some examples, the method may further include transmitting a beacon signal from the first communication device, the beacon signal being transmitted at a nominal power to enable each of the plurality of relay candidates to estimate a pathloss from the first communication device to a respective one of the plurality of relay candidates.

In some examples of the method, the relay search query may communicate the threshold DRD capacity to the plurality of relay candidates. In some of these examples, the method may include communicating directly with the second communication device to estimate a D2D capacity for communications between the first communication device and the second communication device, and configuring the relay search query based at least in part on the D2D capacity estimate. In some examples, the threshold DRD capacity communicated by the relay search query may be greater than the estimated D2D capacity. In some examples, the relay search query may include a second relay search query transmitted in response to a failure to decode a response to a first relay search query. The second relay search query may communicate a different threshold DRD capacity than the first relay search query.

In some examples of the method, receiving the relay search query response may include receiving a plurality of relay search query responses indicating a subset of the relay candidates that provide at least the threshold DRD capacity, and selecting the relay from the subset of the relay candidates. In some of these examples, the plurality of relay search query responses may include a DRD capacity estimate for each relay candidate in the subset of the relay candidates, and selecting the relay may include selecting the relay candidate associated with a greatest DRD capacity estimate. The DRD capacity estimate for each relay candidate may be estimated based at least in part on a first device-to-relay (DR) capacity estimate for the first communication device to the each relay candidate and a second DR capacity estimate for the second communication device to the each relay candidate.

In a second set of illustrative examples, an apparatus for wireless communication is described. In one configuration, the apparatus may include means for transmitting, from a first communication device, a relay search query to a plurality of relay candidates; means for receiving a relay search query response indicating a relay that provides at least a threshold DRD capacity for communications between the first communication device and a second communication device; and means for communicating with the second communication device through the indicated relay based at least in part on the relay search query response. In some examples, the apparatus may further include means for implementing one or more aspects of the method for wireless communication described above with respect to the first set of illustrative examples.

In a third set of illustrative examples, another apparatus for wireless communication is described. In one configuration, the apparatus may include a processor, memory in electronic communication with the processor, and instructions stored in the memory. The instructions may be executable by the processor to transmit, from a first communication device, a relay search query to a plurality of relay candidates; to receive a relay search query response indicating a relay that provides at least a threshold DRD capacity for communications between the first communication device and a second communication device; and to communicate with the second communication device through the indicated relay based at least in part on the relay search query response. In some examples, the instructions may also be executable by the processor to implement one or more aspects of the method for wireless communication described above with respect to the first set of illustrative examples.

In a fourth set of illustrative examples, a computer-readable medium for storing instructions executable by a processor is described. In one configuration, the computer-readable medium my include instructions to transmit, from a first communication device, a relay search query to a plurality of relay candidates; instructions to receive a relay search query response indicating a relay that provides at least a threshold DRD capacity for communications between the first communication device and a second communication device; and instructions to communicate with the second communication device through the indicated relay based at least in part on the relay search query response. In some examples, the computer-readable medium may also include instructions to implement one or more aspects of the method for wireless communication described above with respect to the first set of illustrative examples.

In a fifth set of illustrative examples, another method for wireless communication is described. In one configuration, the method may include estimating, at a relay, a pathloss from each of a plurality of communication devices to the relay to generate a capacity estimate for each communication device; generating a DRD capacity estimate for communications between a first communication device of the plurality of communication devices and a second communication device of the plurality of communication devices; receiving a relay search query from the first communication device; and transmitting a relay search query response to the first communication device in response to the relay search query. The relay search query response may include an indication of the DRD capacity estimate between the first communication device and the second communication device. In some examples, the DRD capacity estimate may be generated based at least in part on a first device-to-relay (DR) capacity estimate for the first communication device to the relay and a second DR capacity estimate for the second communication device to the relay.

In some examples of the method, the relay search query may indicate a threshold DRD capacity. In some of these examples, the method may include determining that the DRD capacity estimate for communications between the first communication device and the second communication device satisfies the threshold DRD capacity, and the relay search query response may be transmitted based at least in part on the determination. In some examples, the indication of the DRD capacity estimate between the first communication device and the second communication device may include a ratio between the DRD capacity estimate and the threshold DRD capacity.

In some examples, the method may include receiving a plurality of beacon signals from the plurality of communication devices, and the pathloss from each of the plurality of communication devices may be based at least in part on one of the plurality of beacon signals. In some examples, each of the plurality of beacon signals may be received over a different time-frequency resource.

In a sixth set of illustrative examples, another apparatus for wireless communication is described. In one configuration, the apparatus may include means for estimating, at a relay, a pathloss from each of a plurality of communication devices to the relay to generate a capacity estimate for each communication device; means for generating a DRD capacity estimate for communications between a first communication device of the plurality of communication devices and a second communication device of the plurality of communication devices; means for receiving a relay search query from the first communication device; and means for transmitting a relay search query response to the first communication device in response to the relay search query. The relay search query response may include an indication of the DRD capacity estimate between the first communication device and the second communication device. In some examples, the apparatus may further include means for implementing one or more aspects of the method for wireless communication described above with respect to the fifth set of illustrative examples.

In a seventh set of illustrative examples, another apparatus for wireless communication is described. In one configuration, the apparatus may include a processor, memory in electronic communication with the processor, and instructions stored in the memory. The instructions may be executable by the processor to estimate, at a relay, a pathloss from each of a plurality of communication devices to the relay to generate a capacity estimate for each communication device; to generate a DRD capacity estimate for communications between a first communication device of the plurality of communication devices and a second communication device of the plurality of communication devices; to receive a relay search query from the first communication device; and to transmit a relay search query response to the first communication device in response to the relay search query. The relay search query response may include an indication of the DRD capacity estimate between the first communication device and the second communication device. In some examples, the instructions may also be executable by the processor to implement one or more aspects of the method for wireless communication described above with respect to the fifth set of illustrative examples.

In an eighth set of illustrative examples, another computer-readable medium for storing instructions executable by a processor is described. In one configuration, the computer-readable medium may include instructions to estimate, at a relay, a pathloss from each of a plurality of communication devices to the relay to generate a capacity estimate for each communication device; instructions to generate a DRD capacity estimate for communications between a first communication device of the plurality of communication devices and a second communication device of the plurality of communication devices; instructions to receive a relay search query from the first communication device; and instructions to transmit a relay search query response to the first communication device in response to the relay search query, the relay search query response comprising an indication of the DRD capacity estimate between the first communication device and the second communication device. In some examples, the computer-readable medium may also include instructions to implement one or more aspects of the method for wireless communication described above with respect to the fifth set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If the first reference label is used in the specification, the description is applicable to any one of the similar components having the same first reference label irrespective of the second reference label.

DETAILED DESCRIPTION

Figure 1:
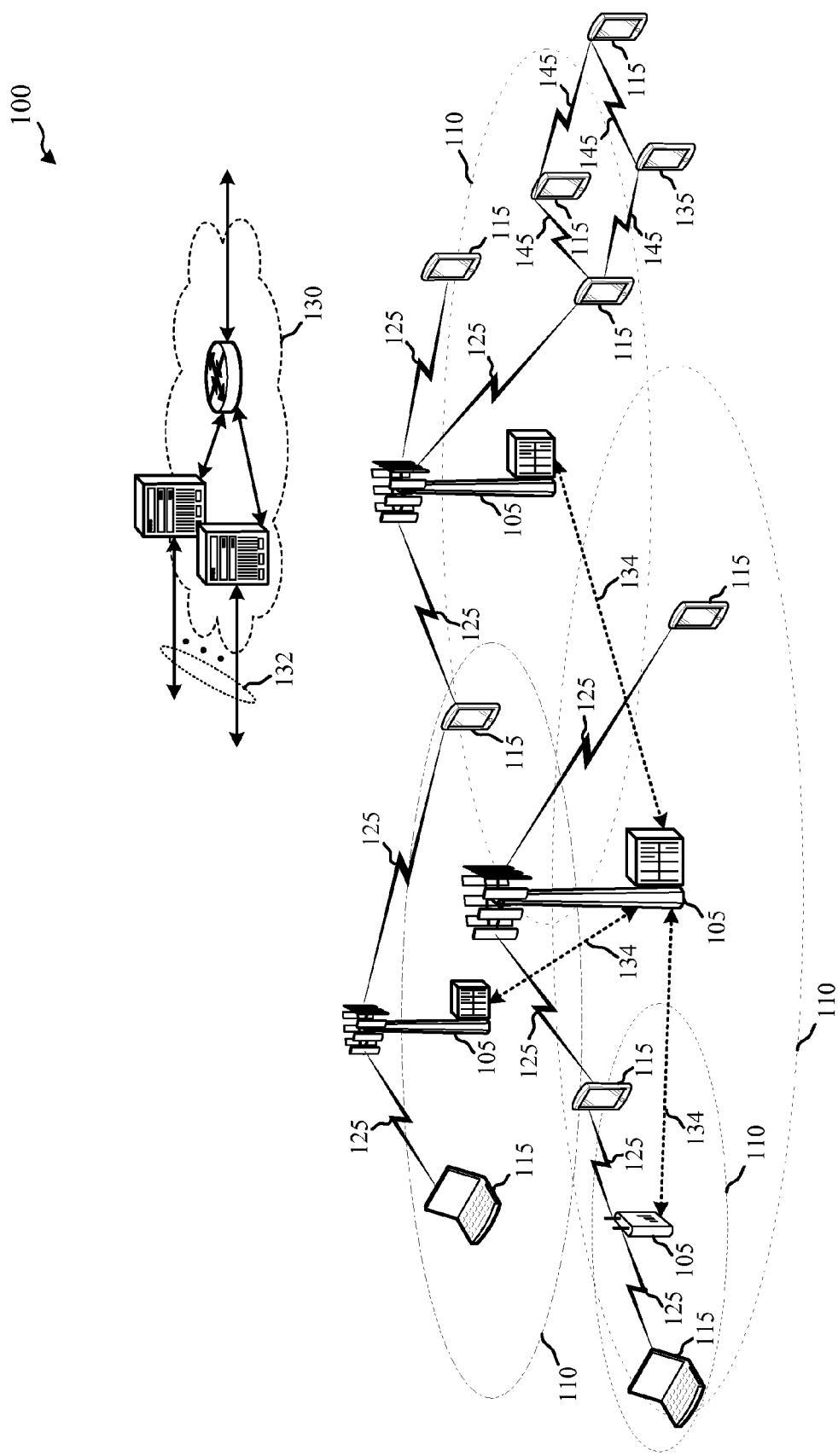
FIG. 1 illustrates an example of a wireless communications system, in accordance with various aspects of the present disclosure.

Features generally relating to one or more improved systems, methods, and/or apparatuses for selecting a relay for device-to-device (D2D) communication. According to various examples, each of a plurality of relays may estimate a pathloss from each of a plurality of communication devices, to the relay, to generate a capacity estimate for each of the plurality of communication devices. Each relay may then generate a DRD capacity estimate for communications between first and second communication devices of the plurality of communication devices. Thereafter, the first communication device may transmit a relay search query to the plurality of relay candidates and receive a relay search query response indicating a relay that provides at least a threshold device-to-relay-to-device (DRD) capacity for communications between the first and second communication devices. The first communication device may communicate with the second communication device through the indicated relay based at least in part on the relay search query response.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

FIG. 1 illustrates an example of a wireless communications system 100, in accordance with various aspects of the present disclosure. The wireless communications system 100 includes base stations 105, communication devices (also known as user equipments (UE) 115), and a core network 130. The base stations 105 may communicate with the UEs 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The wireless communications system 100 may support operation on multiple carriers (waveform signals of different frequencies). Wireless communication links 125 may be modulated according to various radio technologies. Each modulated signal may carry control information (e.g., reference signals, control channels, etc.), overhead information, data, etc. Wireless communication links 145 may also be established between UEs 115, and between UEs 115 and relays 135, for D2D communication. D2D communication directly between two UEs 115 may be referred to as one-hop D2D communication. D2D communication between two UEs 115 through a relay 135 may be referred to as two-hop D2D communication. In some cases, a relay 135 may be an idle UE 115 (or a UE 115 that otherwise has the resources, and capacity, to serve as a relay).

The base stations 105 may wirelessly communicate with the UEs 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up a portion of the coverage area. The wireless communications system 100 may include base stations 105 of different types (e.g., macro, micro, and/or pico base stations). There may be overlapping coverage areas for different technologies.

The wireless communications system 100 may be a Heterogeneous LTE/LTE-A network in which different types of base stations provide coverage for various geographical regions. For example, each base station 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell.

The core network 130 may communicate with the base stations 105 via a backhaul 132 (e.g., S1, etc.). The base stations 105 may also communicate with one another, e.g., directly or indirectly via backhaul links 134 (e.g., X2, etc.) and/or via backhaul links 132 (e.g., through core network 130). The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 may be dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. A UE may be able to communicate with other UEs directly, or through a relay, using D2D communication.

The wireless communication links 125 shown in wireless communications system 100 may include uplink (UL) transmissions from a UE 115 to a base station 105, and/or downlink (DL) transmissions, from a base station 105 to a UE 115 over DL carriers. The downlink transmissions may also be called forward link transmissions while the uplink transmissions may also be called reverse link transmissions.

In some cases, it may be useful to establish a relay 145 between two UEs 115. However, multiple candidate relays may be available. In such cases, a first UE 115 may transmit a relay search query to the candidate relays and receive relay search query responses from the relays. Each relay search query response may indicate a DRD capacity (e.g. data rate) for communications between the first UE 115 and the second UE 115 using an individual relay candidate. Based on the relay search query responses, the first UE 115 may select a relay 145 that provides at least a threshold DRD capacity, and begin communicating with the second UE 115 through the selected relay 145.

Figure 2:
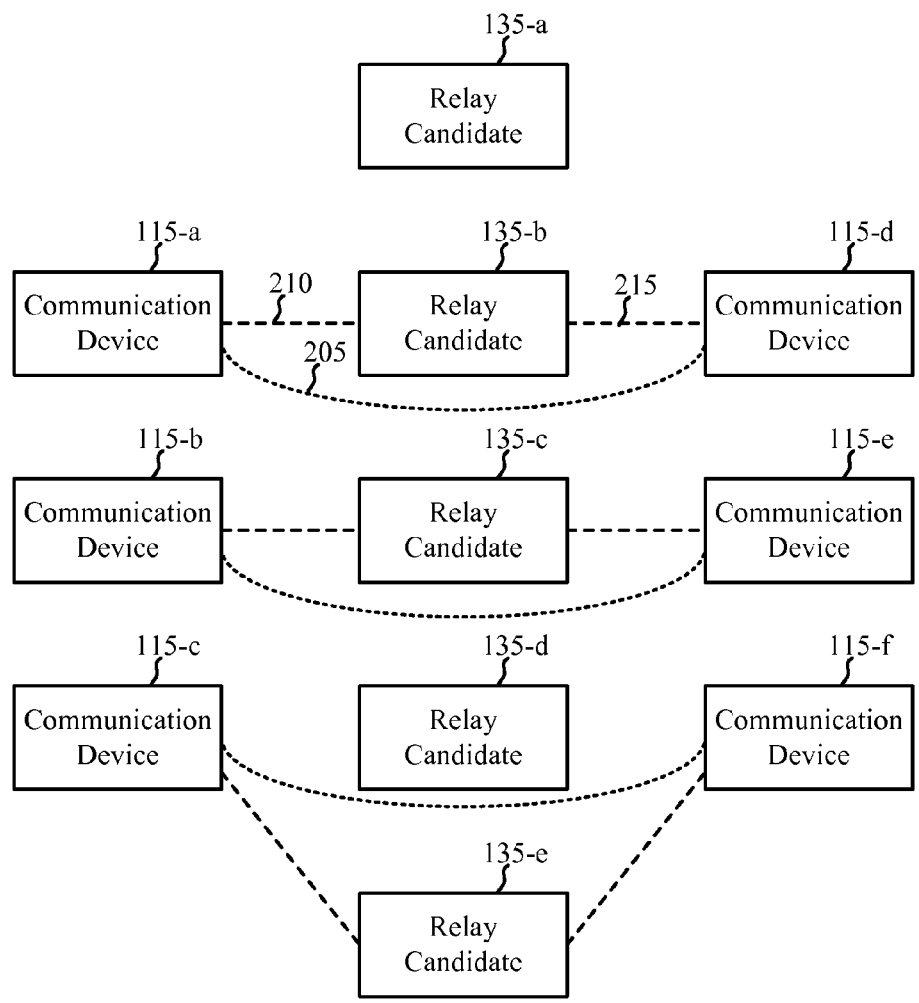
FIG. 2 shows a wireless communication system including a plurality of source communication devices, a plurality of destination communication devices, and a plurality of relay candidates, in accordance with various aspects of the present disclosure.

FIG. 2 shows a wireless communication system 200 including a plurality of source communication devices 115-*a*, 115-*b*, and 115-*c*, a plurality of destination communication devices 115-*d*, 115-*e*, and 115-*f*, and a plurality of relay candidates 135-*a*, 135-*b*, 135-*c*, 135-*d*, and 135-*e*, in accordance with various aspects of the present disclosure. Each of the communication devices 115-*a*, 115-*b*, 115-*c*, 115-*d*, 115-*e*, and 115-*f* may be an example of aspects of one or more of the communication devices 115 described with reference to FIG. 1. Each of the relay candidates 135-*a*, 135-*b*, 135-*c*, 135-*d*, and 135-*e* may be an example of aspects of one or more of the relay candidates 135 described with reference to FIG. 1.

At times, a source communication device (e.g., the source communication device 115-*a*) and a destination communication device (e.g., the destination communication device 115-*d*) may communicate with one another directly (e.g., using a D2D communications protocol over communication link 205). At other times, a source communication device 115-*a* and destination communication device 115-*d* may communicate with one another via a selected one of the relay candidates 135-*a*, 135-*b*, 135-*c*, 135-*d*, or 135-*e* (e.g., using a DRD communications protocol over communication links 210 and 215). To facilitate the selection of a relay for use by the source communication device 115-*a* and the destination communication device 115-*d*, each of the source communication device 115-*a* and the destination communication device 115-*d* may transmit a beacon signal. The beacon signals may be received by the plurality of relay candidates 135-*a*, 135-*b*, 135-*c*, 135-*d*, and 135-*e*. In some examples, each of the communication devices 115 may transmit a beacon signal that may be received by the plurality of relay candidates 135-*a*, 135-*b*, 135-*c*, 135-*d*, and 135-*e*. In some examples, each beacon signal may be transmitted over a number of (e.g., one or more) time-frequency resources that differ(s) from the time-frequency resources used by other communication devices 115 to transmit beacon signals. Each beacon signal may be transmitted at a nominal power, to enable each relay candidate 135 to estimate a pathloss from a respective communication device 115 to the relay candidate 135. The beacon signals may be transmitted by the communication devices 115 during each of a plurality of relay selection periods.

Each of the relay candidates 135 may receive the beacon signals from the communication devices 115 and estimate a pathloss from each of the communication devices 115, to the relay candidate 135, to generate a device-to-relay (DR) capacity estimate for the communication device 115. A DR capacity estimate may be generated for each source communication device 115-*a*, 115-*b*, and 115-*c* and each destination communication device 115-*d*, 115-*e*, and 115-*f*. In some examples, a relay candidate 135 may estimate the pathloss from each of the communication devices 115 to the relay candidate 135 based at least in part on the plurality of beacon signals (e.g., based on measurements (e.g., measured signal strengths) of the beacon signals, which may be compared to the nominal power of the beacon signals).

Upon generating DR capacity estimates, each relay candidate 135 may generate a DRD capacity estimate for communications between each known or potential pairing of source and destination communication devices 115. For example, each relay candidate 135 may generate a DRD capacity estimate for communications between a first communication device 115-*a* and a second communication device 115-*d*. Each DRD capacity estimate may be based at least in part on a first capacity estimate for a source communication device 115 to the relay candidate 135 and a second capacity estimate for a destination communication device 115 to the relay 135.

Each source communication device 115 desiring to communicate with a destination communication device 115 through a relay may transmit a relay search query to the plurality of relay candidates 135. For example, a relay search query may be transmitted by the source communication device 115-*a* to search for a relay to use when communicating with the destination communication device 115-*d*. In some examples, the relay search query transmitted by the source communication device 115-*a* may identify the destination communication device 115-*d*.

A relay candidate 135 that receives a relay search query may transmit a relay search query response. In some cases, a relay search query response may include an indication of the relay's DRD capacity estimate between the source communication device 115 that transmitted the relay search query and the destination communication device 115 with which the source communication device 115 would like to communicate via the relay candidate 135.

Upon receiving a relay search query response indicating a relay 135 that provides at least a threshold DRD capacity between a source communication device 115 and a destination communication device 115, the source communication device 115 may communicate with the destination communication device 115 through the relay 135.

Figure 3:
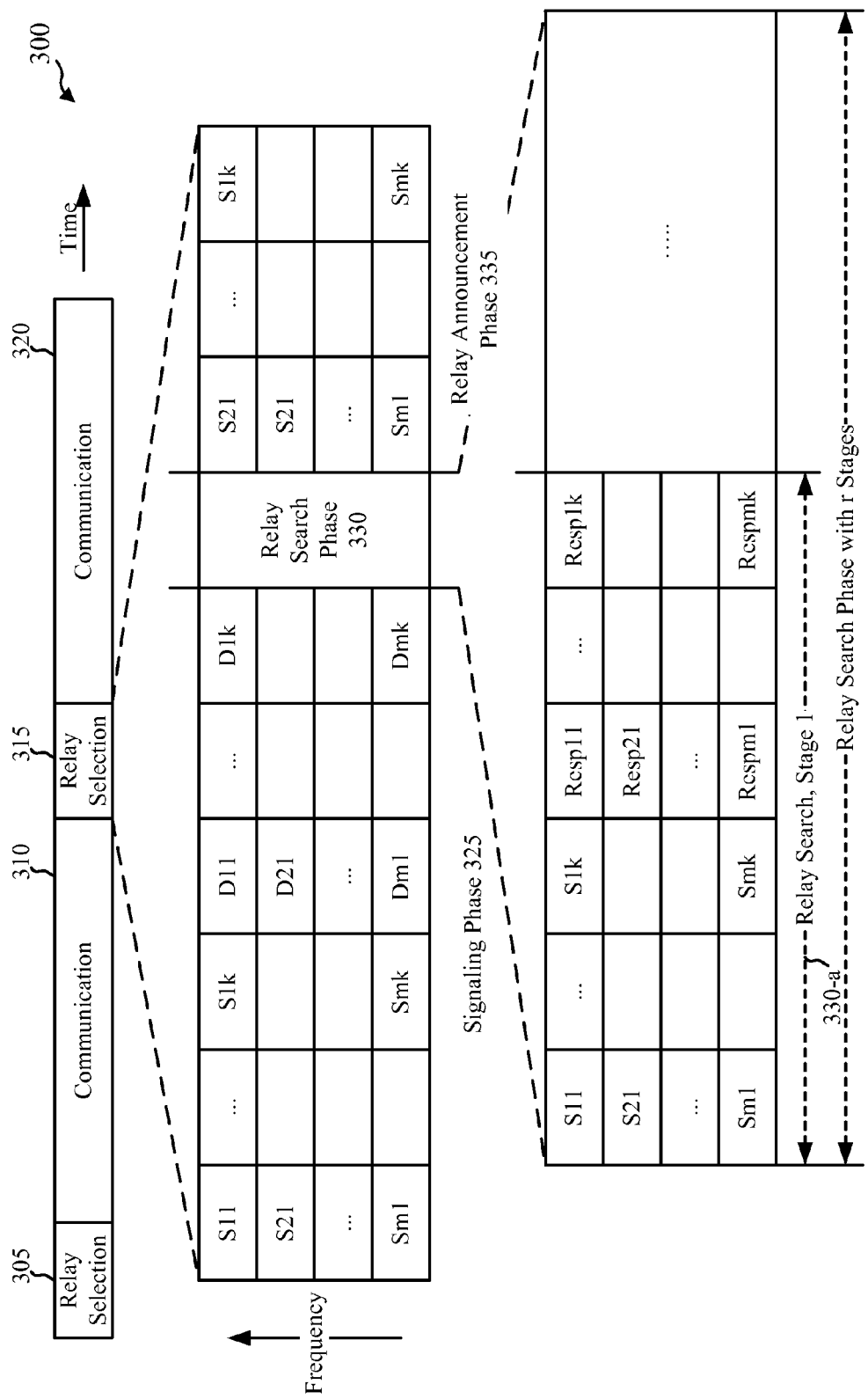
FIG. 3 shows a timing diagram of a relay selection process for wireless communication, in accordance with various aspects of the present disclosure.

FIG. 3 shows a timing diagram 300 of a relay selection process for wireless communication, in accordance with various aspects of the present disclosure. Different parts of the relay selection process may be performed, for example, by one or more communication devices or one or more relay candidates. Each of the communication devices may be an example of aspects of one or more of the communication devices 115 described with reference to FIG. 1 or 2. Each of the relay candidates may be an example of aspects of one or more of the relay candidates 135 described with reference to FIG. 1 or 2.

During the relay selection process shown in FIG. 3, each of a number of communication devices (e.g., a number of source (S) communication devices) may select a relay (R), for DRD communication with another communication device (e.g., a destination (D) communication device), during one or more of a number of relay selection periods 305, 315. The source communication device(s) may then communicate with the destination communication device(s), through the relay(s), during one or more communication periods 310, 320. In some cases, the source communication device(s) may also communicate with the destination device (s) during the relay selection periods 305, 315. One or more source communication device and destination communication device may also communicate directly, during the relay selection periods 305, 315 or the communication periods 310, 320, using a D2D communications protocol.

A relay selection period (e.g., relay selection period 315) may include three phases of operation: a signaling phase 325, a relay search phase 330, and a relay announcement phase 335. During the signaling phase 325, each of a plurality of source and destination communication devices may transmit a beacon signal. Each beacon signal may be transmitted over a number of time-frequency resources. In some examples, the time-frequency resource(s) used by one communication device (e.g., S11) for the transmission of a beacon signal may differ from the time-frequency resources used by other communication devices (e.g., S21, S12, . . . , Smk) for the transmission of beacon signals (or differ from the time-frequency resources used by a number of nearest neighbor communication devices). Each beacon signal may be transmitted at a nominal power, to enable each relay candidate (R) to estimate a pathloss from each communication device to the relay candidate.

Also during the signaling phase 325, or during the relay search phase 330, each of the relay candidates may estimate the pathloss from each communication device to the respective relay candidate, to generate a DR capacity estimate for the relay candidate for each of the plurality of communication devices. Each relay candidate may also generate a DRD capacity estimate for communications between each known or potential pairing of source and destination communication devices. Each DRD capacity estimate may be based at least in part on a first DR capacity estimate for a source communication device to the relay candidate and a second DR capacity estimate for a destination communication device to the relay candidate.

During the relay search phase 330, and for each source (S) communication device (e.g., each source communication device S11 . . . Smk) desiring to communicate with a destination communication device through a relay, the source communication device may transmit a relay search query to the plurality of relay candidates. For example, the source communication device S11 may announce its relay selection during the time-frequency resource(s) of the relay search phase 330 labeled S11, and the source communication device Smk may announce its relay selection during the time-frequency resource(s) of the relay search phase labeled Smk. In some examples, each relay search query may identify a destination communication device with which a source communication device desires to communicate. Each relay search query may also indicate a threshold DRD capacity. Each source communication device may receive a number of relay search query responses, if any, from the relay candidates. In some examples, a source communication device may just receive a relay search query response from relay candidates that are able to satisfy the threshold DRD capacity indicated in the source communication device's relay search query. The number of relay search query responses to the relay search query transmitted by the source communication device S11 may be received during the time-frequency resource(s) labeled Resp11; the number of relay search query responses to the relay search query transmitted by the source communication device Smk may be received during the time-frequency resource(s) labeled Respmk; and so on. In some cases, the relay search query responses transmitted to a source communication device may overlap, and the source communication device may not be able to decode the relay search query responses unless the number of relay search query responses is sufficiently low (and in some cases, the source communication device may not be able to decode the number of relay search query response unless the number of relay search query responses is one relay search query response). Each relay search query response may include an indication of a respective relay candidate's DRD capacity estimate between the source communication device and a destination communication device.

When a source communication device is able to decode the relay search query responses it receives, the source communication device may select a relay associated with one of the relay search query responses for communicating with a destination communication device. When a source communication device fails to decode the relay search query responses it receives, the source communication device may generate a new threshold DRD capacity (e.g., a greater threshold DRD capacity, such as a threshold DRD capacity that is twice the previously generated threshold DRD capacity) and repeat the relay search query/response process again. Time-frequency resources may be allocated for a predetermined or dynamic number of r relay search stages (e.g., Relay Search, Stage 1 330-*a*; etc.) during the relay search phase 330.

During the relay announcement phase 335, each source (S) communication device may announce its relay selection. Each relay selection may be announced during a different time-frequency resource (or resources). For example, the source communication device S11 may announce its relay selection during the time-frequency resource(s) of the relay announcement phase labeled S11, and the source communication device Smk may announce its relay selection during the time-frequency resource(s) of the relay announcement phase labeled Smk.

In practice, there may be different numbers of the various devices (e.g., source communication device, destination communication devices, and relay candidates), and different overlapping or non-overlapping subsets of the devices may participate in relay selection during each relay selection period (e.g., during the relay selection period 305 or 315).

Figure 4:
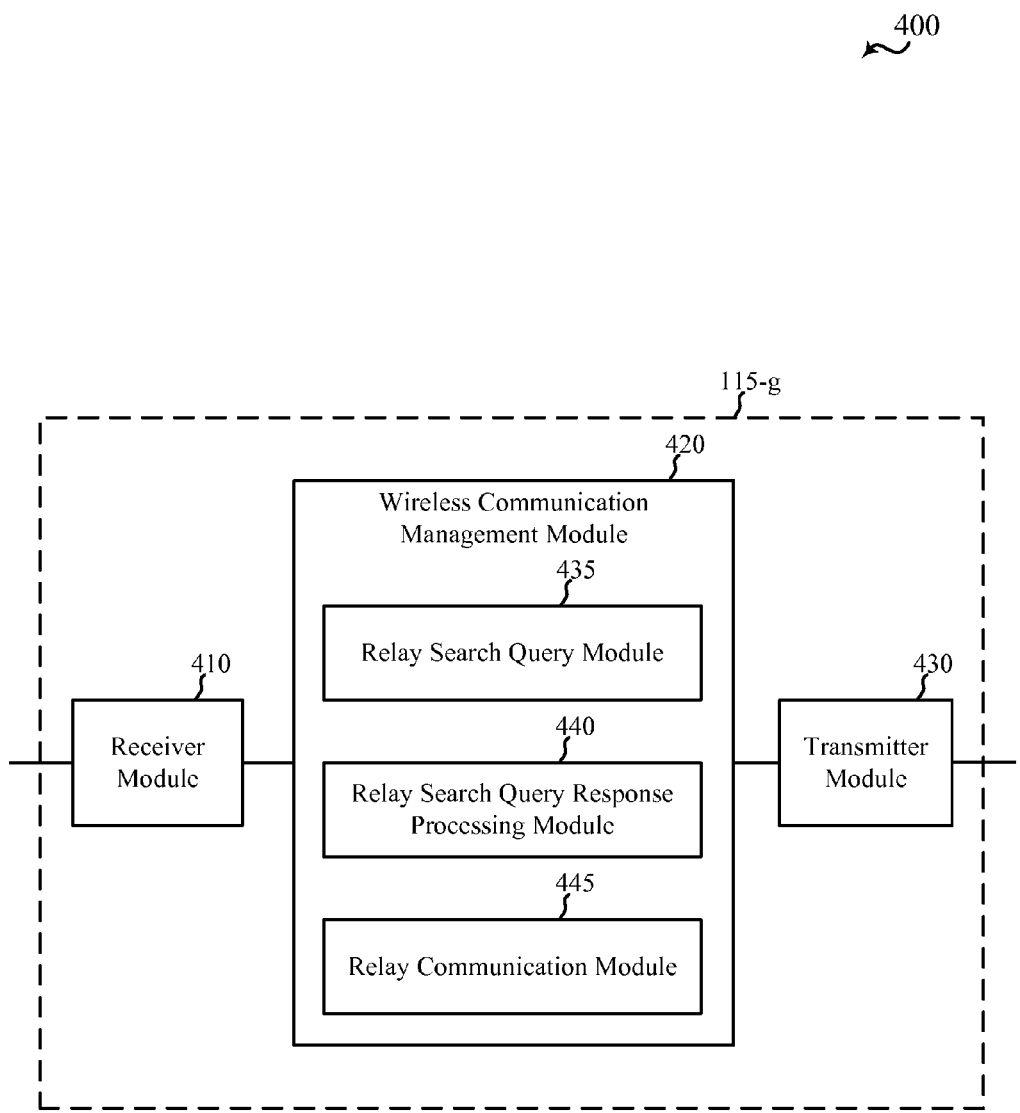
FIG. 4 shows a block diagram of a first communication device for use in wireless communication, in accordance with various aspects of the present disclosure.

FIG. 4 shows a block diagram 400 of a first communication device 115-*g* for use in wireless communication, in accordance with various aspects of the present disclosure. The first communication device 115-*g* may be an example of aspects of one or more of the communication devices 115 described with reference to FIG. 1 or 2. The first communication device 115-*g* may also be or include a processor. The first communication device 115-*g* may include a receiver module 410, a wireless communication management module 420, or a transmitter module 430. Each of these modules may be in communication with each other.

The modules of the first communication device 115-*g* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 410 may include at least one radio frequency (RF) receiver. The receiver module 410 or RF receiver may be used to receive various types of data or control signals (i.e., transmissions) over one or more communication links of a wireless communication system, such as one or more communication links of the wireless communication system 100 or 200 described with reference to FIG. 1 or 2.

In some examples, the transmitter module 430 may include at least one RF transmitter. The transmitter module 430 or RF transmitter may be used to transmit various types of data or control signals (i.e., transmissions) over one or more communication links of a wireless communication system, such as one or more communication links of the wireless communication system 100 or 200 described with reference to FIG. 1 or 2.

The wireless communication management module 420 may be used to manage one or more aspects of wireless communication for the first communication device 115-*g*. In some examples, the wireless communication management module 420 may include a relay search query module 435, a relay search query response processing module 440, or a relay communication module 445.

The relay search query module 435 may be used to transmit a relay search query to a plurality of relay candidates. In some examples, the relay search query may identify a second communication device with which the first communication device 115-*g* desires to communicate. In some examples, the relay search query may be transmitted via the transmitter module 430.

The relay search query response processing module 440 may be used to receive a relay search query response indicating a relay that provides at least a threshold DRD capacity (e.g., a threshold end-to-end link capacity) for communications between the first communication device 115-*g* and a second communication device. In some examples, the relay search query response may be received via the receiver module 410.

The relay communication module 445 may be used to communicate with the second communication device, through the indicated relay, based at least in part on the relay search query response.

In some examples, the first communication device 115-*g* may be a source communication device, such as the source communication device 115-*a* described with reference to FIG. 2, and the second communication device may be a destination communication device, such as the destination communication device 115-*d* described with reference to FIG. 2. In other examples, the first communication device 115-*g* may be a destination communication device, such as the destination communication device 115-*d* described with reference to FIG. 2, and the second communication device may be a source communication device, such as the source communication device 115-*a* described with reference to FIG. 2. In either example, the plurality of relay candidates may be examples of aspects of the relay candidates 135 described with reference to FIG. 1 or 2.

Figure 5:
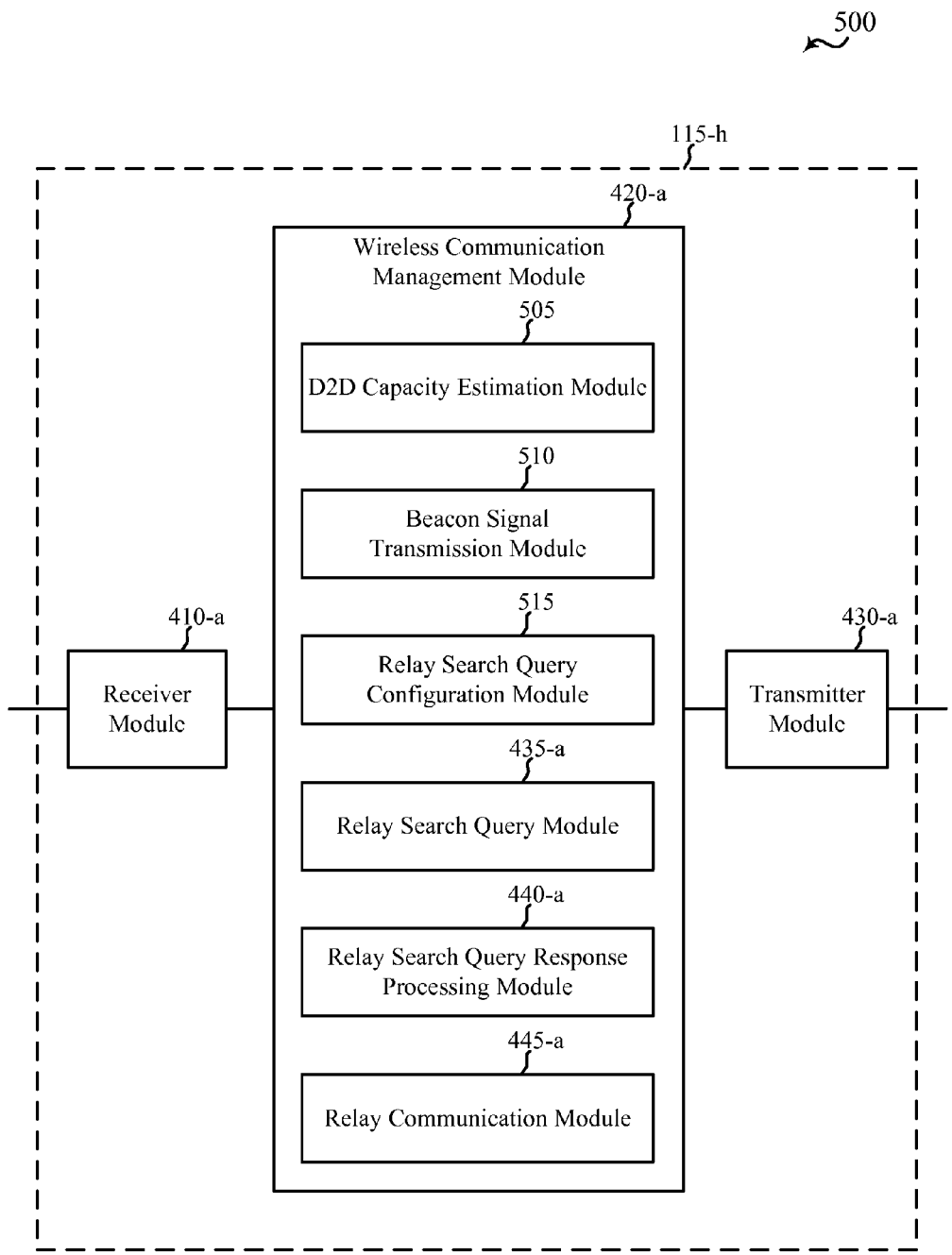
FIG. 5 shows a block diagram of a first communication device for use in wireless communication, in accordance with various aspects of the present disclosure.

FIG. 5 shows a block diagram 500 of a first communication device 115-*h* for use in wireless communication, in accordance with various aspects of the present disclosure. The first communication device 115-*h* may be an example of aspects of one or more of the communication devices 115 described with reference to FIG. 1, 2, or 4. The first communication device 115-*h* may also be or include a processor. The first communication device 115-*h* may include a receiver module 410-*a*, a wireless communication management module 420-*a*, or a transmitter module 430-*a*. Each of these modules may be in communication with each other. In some examples, the receiver module 410-*a* and transmitter module 430-*a* may be examples of the receiver module 410 and transmitter module 430 described with reference to FIG. 4.

The modules of the first communication device 115-*h* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each module may also be implemented, in whole or in part, with instructions embodied in a memory, formatted to be executed by one or more general or application-specific processors.

The wireless communication management module 420-*a* may be used to manage one or more aspects of wireless communication for the first communication device 115-*h*. In some examples, the wireless communication management module 420-*a* may include a D2D capacity estimation module 505, a beacon signal transmission module 510, a relay search query configuration module 515, a relay search query module 435-*a*, a relay search query response processing module 440-*a*, or a relay communication module 445-*a*.

The D2D capacity estimation module 505 may be used to communicate directly with a second communication device to estimate a D2D capacity for communications between the first communication device 115-*h* and the second communication device.

The beacon signal transmission module 510 may be used to transmit a beacon signal. In some examples, the beacon signal may be transmitted over a time-frequency resource (or resources) that differ(s) from the time-frequency resources used by other communication devices for beacon signal transmission. The beacon signal may be transmitted at a nominal power, to enable each of a plurality of relay candidates to estimate a pathloss from the first communication device 115-*h* to a respective one of the relay candidates.

The relay search query configuration module 515 may be used to configure a relay search query based at least in part on the D2D capacity estimate. In some examples, configuring the relay search query based at least in part on the D2D capacity estimate may include configuring a threshold DRD capacity for communications between the first communication device 115-*h* and the second communication device. In some examples, configuring the threshold DRD capacity may include setting the threshold DRD capacity to be greater than the D2D capacity estimate.

The relay search query module 435-*a* may be used to transmit the relay search query to a plurality of relay candidates. In some examples, the relay search query may identify the second communication device. In some examples, the relay search query may communicate the threshold DRD capacity to the plurality of relay candidates. In some examples, the relay search query may be transmitted via the transmitter module 430-*a*.

The relay search query response processing module 440-*a* may be used to receive a relay search query response indicating a relay that provides at least the threshold DRD capacity for communications between the first communication device 115-*h* and the second communication device. In some examples, the relay search query response may be received via the receiver module 410-*a*.

The relay communication module 445-*a* may be used to communicate with the second communication device, through the indicated relay, based at least in part on the relay search query response.

In some examples, the first communication device 115-*h* may be a source communication device, such as the source communication device 115-*a* described with reference to FIG. 2, and the second communication device may be a destination communication device, such as the destination communication device 115-*d* described with reference to FIG. 2. In other examples, the first communication device 115-*h* may be a destination communication device, such as the destination communication device 115-*d* described with reference to FIG. 2, and the second communication device may be a source communication device, such as the source communication device 115-*a* described with reference to FIG. 2. In either example, the plurality of relay candidates may be examples of aspects of the relay candidates 135 described with reference to FIG. 1 or 2.

Figure 6:
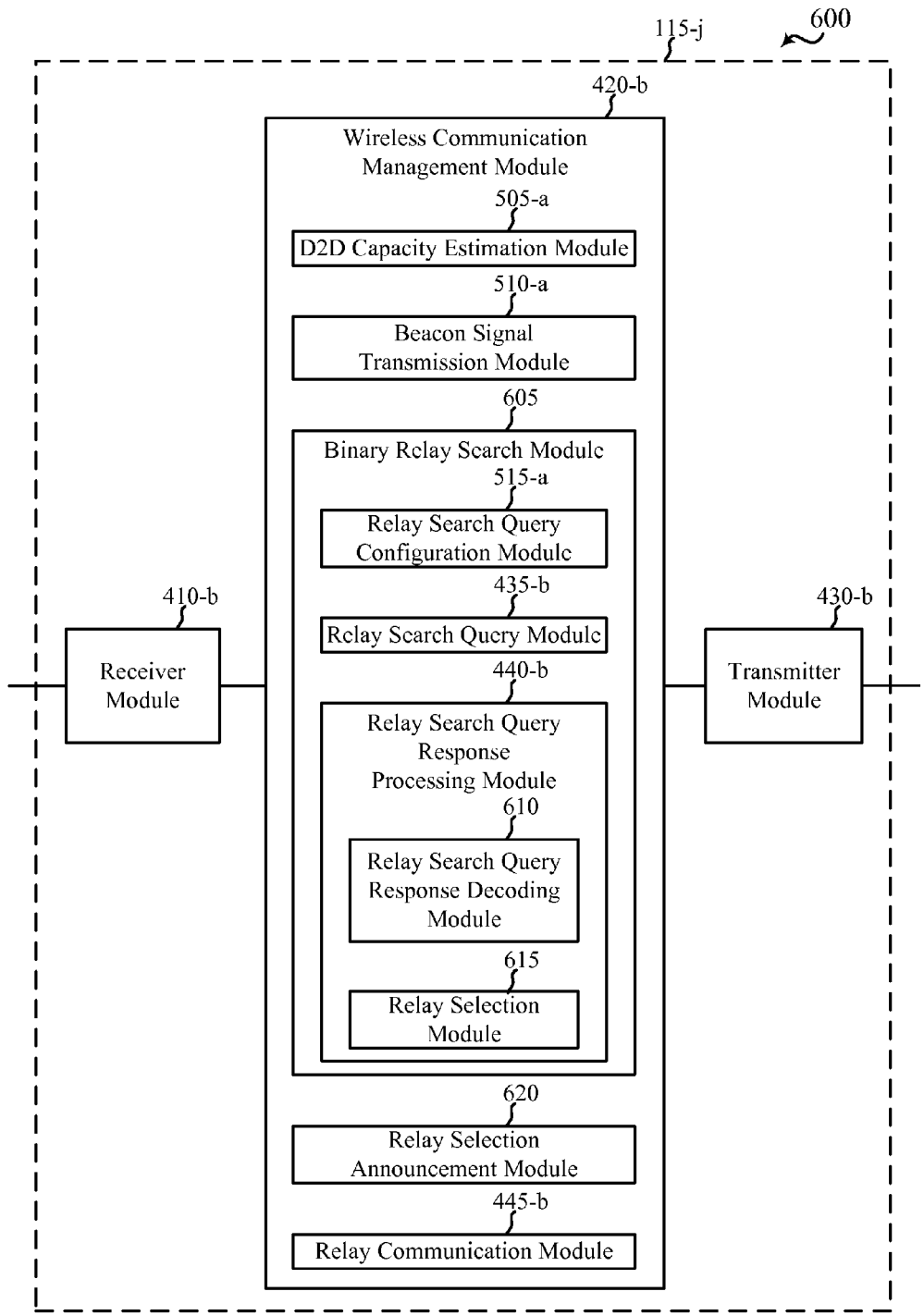
FIG. 6 shows a block diagram of a first communication device for use in wireless communication, in accordance with various aspects of the present disclosure.

FIG. 6 shows a block diagram 600 of a first communication device 115-*j* for use in wireless communication, in accordance with various aspects of the present disclosure. The first communication device 115-*j* may be an example of aspects of one or more of the communication devices 115 described with reference to FIG. 1, 2, 4, or 5. The first communication device 115-*j* may also be or include a processor. The first communication device 115-*j* may include a receiver module 410-*b*, a wireless communication management module 420-*b*, or a transmitter module 430-*b*. Each of these modules may be in communication with each other. In some examples, the receiver module 410-*b* and transmitter module 430-*b* may be examples of the receiver module 410 and transmitter module 430 described with reference to FIG. 4.

The modules of the first communication device 115-*j* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each module may also be implemented, in whole or in part, with instructions embodied in a memory, formatted to be executed by one or more general or application-specific processors.

The wireless communication management module 420-*b* may be used to manage one or more aspects of wireless communication for the first communication device 115-*j*. In some examples, the wireless communication management module 420-*b* may include a D2D capacity estimation module 505-*a*, a beacon signal transmission module 510-*a*, a binary relay search module 605, a relay selection announcement module 620, or a relay communication module 445-*b*.

The D2D capacity estimation module 505-*a* may be used to communicate directly with a second communication device to estimate a D2D capacity ($C_S$) for communications between the first communication device 115-*j* and the second communication device. Alternatively, the first communication device 115-*j* may communicate with the second communication device through a relay, and the D2D capacity estimation module 505 may estimate an existing relay-assisted capacity ($C_S$) for communications between the first communication device and the second communication device.

The beacon signal transmission module 510-*a* may be used to transmit a beacon signal. In some examples, the beacon signal may be transmitted over a time-frequency resource (or resources) that differ(s) from the time-frequency resources used by other communication devices for beacon signal transmission. The beacon signal may be transmitted at a nominal power, to enable each of a plurality of relay candidates to estimate a pathloss from the first communication device 115-*j* to a respective one of the relay candidates.

The binary relay search module 605 may be used to initiate a binary relay search procedure. In some examples, the binary relay search module 605 may include a relay search query configuration module 515-*a*, a relay search query module 435-*b*, a relay search query response processing module 440-*b*, or a relay selection module 615. The relay search query configuration module 515-*a* may be used to configure a relay search query based at least in part on the D2D capacity estimate, relay-assisted capacity, and/or a prior threshold DRD capacity. In some examples, configuring the relay search query based at least in part on the D2D capacity estimate or prior threshold DRD capacity may include configuring a threshold DRD capacity for communications between the first communication device 115-*j* and the second communication device. In some examples, configuring the threshold DRD capacity may include setting the threshold DRD capacity to be the same or different than (e.g., greater than (e.g., 10× greater than) the D2D capacity estimate or relay-assisted capacity ($C_S$)), or different than (e.g., greater than (e.g. 2× greater than)) the prior threshold DRD capacity.

The relay search query module 435-*b* may be used to transmit a relay search query configured by the relay search query configuration module 515-*a* to a plurality of relay candidates. In some examples, the relay search query may identify the second communication device. In some examples, the relay search query may communicate the threshold DRD capacity to the plurality of relay candidates. In some examples, the relay search query may be transmitted via the transmitter module 430-*b*.

The relay search query response processing module 440-*b* may be used to receive a number of relay search query responses in response to a relay search query transmitted by the relay search query module 435-*b*. In some cases, the number of relay search query responses may include a single relay search query response indicating a relay candidate that provides at least a threshold DRD capacity communicated in a relay search query. In other cases, the plurality of relay search query responses may indicate a subset of the relay candidates that provide at least the threshold DRD capacity. In still other cases, no relay search query response may be received, in which case the relay search query response processing module 440-*b* may return control to the relay search query configuration module 515-*a* for the configuration of a new threshold DRD capacity (e.g., a threshold DRD capacity that is ½ the prior threshold DRD capacity). In some examples, the relay search query response(s) may be received via the receiver module 410-*b*.

In some examples, the relay search query response processing module 440-*b* may include a relay search query response decoding module 610 or a relay selection module 615. The relay search query response decoding module 610 may be used to decode a number of relay search query responses received by the relay search query response processing module 440-*b*. Decoding a relay search query response may include extracting a DRD capacity estimate for a respective relay candidate in the plurality of relay candidates. In some examples, the DRD capacity estimate may be indicated by a ratio between the DRD capacity estimate ($C_R$) and the threshold DRD capacity. When the number of relay search query responses is successfully decoded, the relay search query response processing module 440-*b* may trigger operation of the relay selection module 615.

The relay selection module 615 may be used to select a relay from among the plurality of relay candidates. When a number of relay search query responses received by the relay search query response processing module 440-*b* includes a single relay search query response, a relay candidate indicated by the relay search query response may be selected. When the number of relay search query responses includes a plurality of relay search query responses, a relay candidate associated with a greatest DRD capacity estimate may be selected.

The relay selection announcement module 620 may be used to announce a relay selection made by the relay selection module 615. In some examples, the announcement may be made in a broadcast announcement. In other examples, the announcement may be made in one or more transmissions to the selected relay and/or the second communication device.

The relay communication module 445-b may be used to communicate with the second communication device through the selected relay.

In some examples, the first communication device 115-j may be a source communication device, such as the source communication device 115-a described with reference to FIG. 2, and the second communication device may be a destination communication device, such as the destination communication device 115-d described with reference to FIG. 2. In other examples, the first communication device 115-j may be a destination communication device, such as the destination communication device 115-d described with reference to FIG. 2, and the second communication device may be a source communication device, such as the source communication device 115-a described with reference to FIG. 2. In either example, the plurality of relay candidates may be examples of aspects of the relay candidates 135 described with reference to FIG. 1 or 2.

Figure 7:
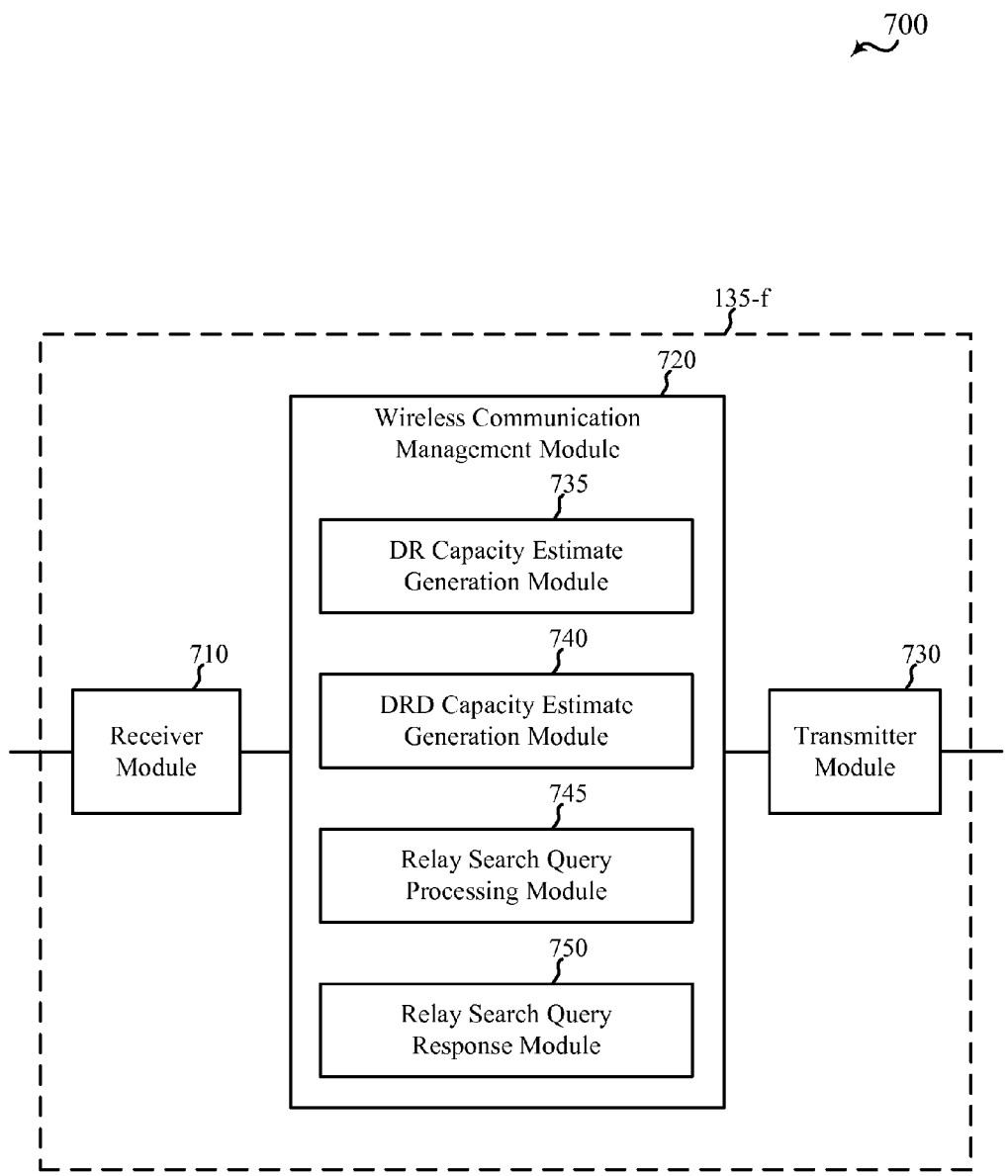
FIG. 7 shows a block diagram of a relay for use in wireless communication, in accordance with various aspects of the present disclosure.

FIG. 7 shows a block diagram 700 of a relay 135-f for use in wireless communication, in accordance with various aspects of the present disclosure. The relay 135-f may be an example of aspects of one or more of the relay candidates 135 described with reference to FIG. 1 or 2. The relay 135-f may also be or include a processor. The relay 135-f may include a receiver module 710, a wireless communication management module 720, or a transmitter module 730. Each of these modules may be in communication with each other.

The modules of the relay 135-f may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 710 may include at least one RF receiver. The receiver module 710 or RF receiver may be used to receive various types of data or control signals (i.e., transmissions) over one or more communication links of a wireless communication system, such as one or more communication links of the wireless communication system 100 or 200 described with reference to FIG. 1 or 2.

In some examples, the transmitter module 730 may include at least one RF transmitter. The transmitter module 730 or RF transmitter may be used to transmit various types of data or control signals (i.e., transmissions) over one or more communication links of a wireless communication system, such as one or more communication links of the wireless communication system 100 or 200 described with reference to FIG. 1 or 2.

The wireless communication management module 720 may be used to manage one or more aspects of wireless communication for the relay candidate 135-f. In some examples, the wireless communication management module 720 may include a device-to-relay (DR) capacity estimate generation module 735, a DRD capacity estimate generation module 740, a relay search query processing module 745, or a relay search query response module 750.

The DR capacity estimate generation module 735 may be used to estimate a pathloss from each of a plurality of communication devices, to the relay 135-f, to generate a capacity estimate for each communication device. In some cases, the communication devices may include source communication devices and destination communication devices.

The DRD capacity estimate generation module 740 may be used to generate a DRD capacity estimate for communications between a first communication device and a second communication device of the plurality of communication devices. In some examples, the relay 135-f may generate a DRD capacity estimate for communications between each known or potential pairing of source and destination communication devices. Each DRD capacity estimate may be based at least in part on a first capacity estimate for a source communication device to the relay 135-f and a second capacity estimate for a destination communication device to the relay 135-f.

The relay search query processing module 745 may be used to receive a relay search query from the first communication device.

The relay search query response module 750 may be used to transmit a relay search query response to the first communication device, in response to the relay search query. The relay search query response may include an indication of the DRD capacity estimate between the first communication device and the second communication device.

Figure 8:
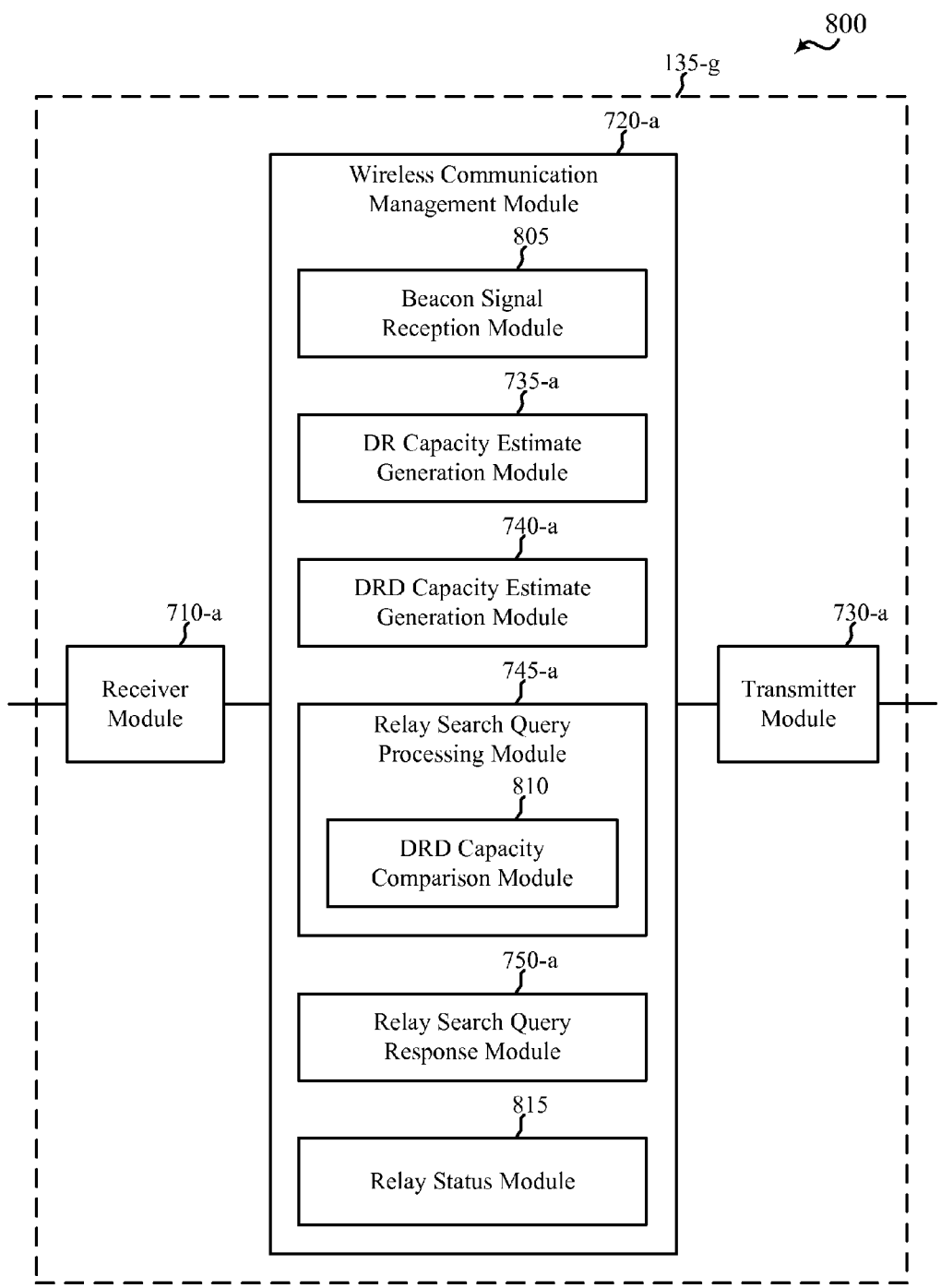
FIG. 8 shows a block diagram of a relay for use in wireless communication, in accordance with various aspects of the present disclosure.

FIG. 8 shows a block diagram 800 of a relay 135-g for use in wireless communication, in accordance with various aspects of the present disclosure. The relay 135-g may be an example of aspects of one or more of the relays or relay candidates 135 described with reference to FIG. 1, 2, or 7. The relay 135-g may also be or include a processor. The relay 135-g may include a receiver module 710-a, a wireless communication management module 720-a, or a transmitter module 730-a. Each of these modules may be in communication with each other. In some examples, the receiver module 710-a and transmitter module 730-a may be examples of the receiver module 710 and transmitter module 730 described with reference to FIG. 7.

The modules of the relay 135-g may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each module may also be implemented, in whole or in part, with instructions embodied in a memory, formatted to be executed by one or more general or application-specific processors.

The wireless communication management module 720-a may be used to manage one or more aspects of wireless communication for the relay candidate 135-g. In some examples, the wireless communication management module 720-a may include a beacon signal reception module 805, a DR capacity estimate generation module 735-a, a DRD capacity estimate generation module 740-*a*, a relay search query processing module 745-*a*, a relay search query response module 750-*a*, or a relay status module 815.

The beacon signal reception module 805 may be used to receive a plurality of beacon signals from a plurality of communication devices. In some cases, the communication devices may include source communication devices and destination communication devices. In some examples, each of the plurality of beacon signals may be received over a different time-frequency resource (or resources). Each beacon signal may be transmitted at a nominal power, to enable the relay to estimate a pathloss from each of the plurality of communication devices to the relay 135-*g*.

The DR capacity estimate generation module 735-*a* may be used to estimate a pathloss from each of the plurality of communication devices, to the relay 135-*g*, to generate a capacity estimate for each communication device. In some examples, the relay 135-*g* may estimate the pathloss from each of the plurality of communication devices to the relay 135-*g* based at least in part on the plurality of beacon signals (e.g., based on measurements (e.g., measured signal strengths) of the beacon signals, which may be compared to the nominal power of the beacon signals).

The DRD capacity estimate generation module 740-*a* may be used to generate a DRD capacity estimate ($C_R$) for communications between a first communication device and a second communication device of the plurality of communication devices. In some examples, the relay 135-*g* may generate a DRD capacity estimate for communications between each known or potential pairing of source and destination communication devices. Each DRD capacity estimate may be based at least in part on a first capacity estimate for a source communication device to the relay 135-*g* and a second capacity estimate for a destination communication device to the relay 135-*g*.

The relay search query processing module 745-*a* may be used to receive a relay search query from the first communication device. In some examples, the relay search query may indicate a threshold DRD capacity. In some examples, the relay search query may identify the second communication device.

In some examples, the relay search query processing module 745-*a* may include a DRD capacity comparison module 810. The DRD capacity comparison module 810 may be used to determine whether the DRD capacity estimate for communication between the first communication device and the second communication device, as determined by the relay 135-*g*, satisfies the threshold DRD capacity indicated in the relay search query. When the DRD capacity estimate satisfies the threshold DRD capacity, the relay search query processing module 745-*a* may trigger operation of the relay search query response module 750-*a*. When the DRD capacity estimate does not satisfy the threshold DRD capacity, the relay search query processing module 745-*a* may cause the relay 135-*g* to wait for receipt of a next set of beacon signals or a next relay search query.

The relay search query response module 750-*a* may be used to transmit a relay search query response to the first communication device, based at least in part on the determination made by the DRD capacity comparison module 810. The relay search query response may include an indication of the DRD capacity estimate between the first communication device and the second communication device. In some examples, the indication of the DRD capacity estimate may include a ratio between the DRD capacity estimate and the threshold DRD capacity. The relay search query response may be transmitted via the transmitter module 730-*a*.

The relay status module 815 may be used to receive a relay selection announcement from each of one or more communication devices that have selected the relay 135-*g* for DRD communications. In some cases, a relay selection announcement may be received from a source communication device. In some cases, a relay selection announcement may be received from a destination communication device. The relay selection announcement(s) may be received via the receiver module 710-*a*.

Figure 9:
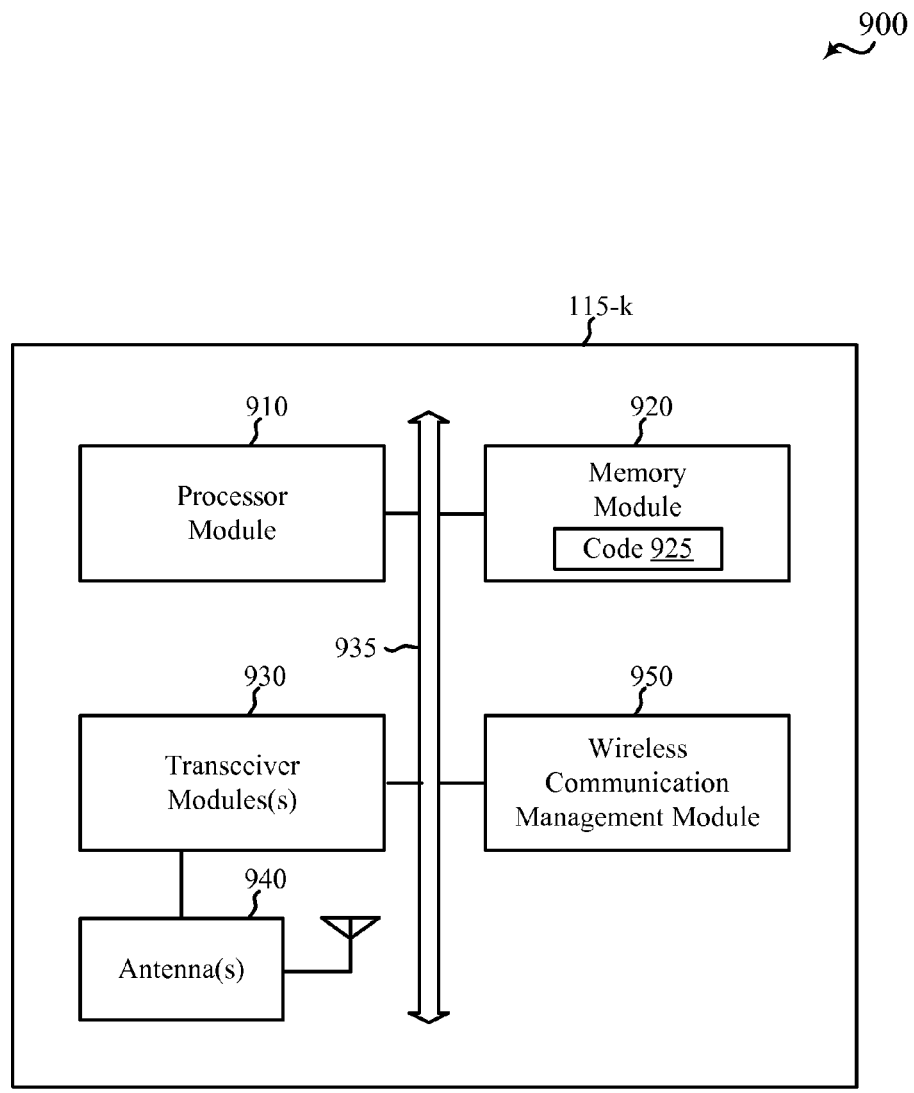
FIG. 9 shows a block diagram of a communication device (or UE) for use in wireless communication, in accordance with various aspects of the present disclosure.

FIG. 9 shows a block diagram 900 of a communication device (or UE) 115-*k* for use in wireless communication, in accordance with various aspects of the present disclosure. The communication device 115-*k* may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The communication device 115-*k* may, in some examples, have an internal power supply (not shown), such as a small battery, to facilitate mobile operation. In some examples, the communication device 115-*k* may be an example of aspects of one or more of the communication devices 115 described with reference to FIG. 1, 2, 4, 5, or 6. The communication device 115-*k* may be configured to implement at least some of the communication device features and functions described with reference to FIG. 1, 2, 3, 4, 5, or 6.

The communication device 115-*k* may include a processor module 910, a memory module 920, at least one transceiver module (represented by transceiver module(s) 930), at least one antenna (represented by antenna(s) 940), or a wireless communication management module 950. Each of these components may be in communication with each other, directly or indirectly, over one or more buses 935.

The memory module 920 may include random access memory (RAM) or read-only memory (ROM). The memory module 920 may store computer-readable, computer-executable code 925 containing instructions that are configured to, when executed, cause the processor module 910 to perform various functions described herein related to selecting a relay for communication with another communication device, or to facilitating a relay selection by another communication device.

The processor module 910 may include an intelligent hardware device, e.g., a central processing unit (CPU), a microcontroller, an ASIC, etc. The processor module 910 may process information received through the transceiver module(s) 930 or information to be sent to the transceiver module(s) 930 for transmission through the antenna(s) 940. The processor module 910 may handle, alone or in connection with the wireless communication management module 950, various aspects of communicating over (or managing communications over) a wireless spectrum (e.g., using a D2D or DRD communication protocol).

The transceiver module(s) 930 may include a modem configured to modulate packets and provide the modulated packets to the antenna(s) 940 for transmission, and to demodulate packets received from the antenna(s) 940. The transceiver module(s) 930 may, in some examples, be implemented as one or more transmitter modules and one or more separate receiver modules, as shown, for example, in FIG. 4, 5, or 6. The transceiver module(s) 930 may be configured to communicate bi-directionally, via the antenna(s) 940, with one or more other communication devices (including, for example, UEs, relays, or base stations). While the communication device 115-k may include a single antenna, there may be examples in which the communication device 115-k may include multiple antennas 940.

The wireless communication management module 950 may be configured to perform or control some or all of the communication device features or functions described with reference to FIG. 1, 2, 3, 4, 5, or 6 related to wireless communication. The wireless communication management module 950, or portions of it, may include a processor, or some or all of the functions of the wireless communication management module 950 may be performed by the processor module 910 or in connection with the processor module 910. In some examples, the wireless communication management module 950 may be an example of the wireless communication management module 420 described with reference to FIG. 4, 5, or 6.

In some embodiments, a relay (or relay candidate), such as one or more of the relays (or relay candidates) 135 described with reference to FIG. 1, 2, 7, or 8 may be configured similarly to the communication device 115-k, but with the wireless communication management module 950 being an example of the wireless communication management module 720 described with reference to FIG. 7 or 8, and with the processor module 910 configured to perform various functions described herein related to estimating DR capacities or DRD capacities and facilitating relay selection by a communication device.

Figure 10:
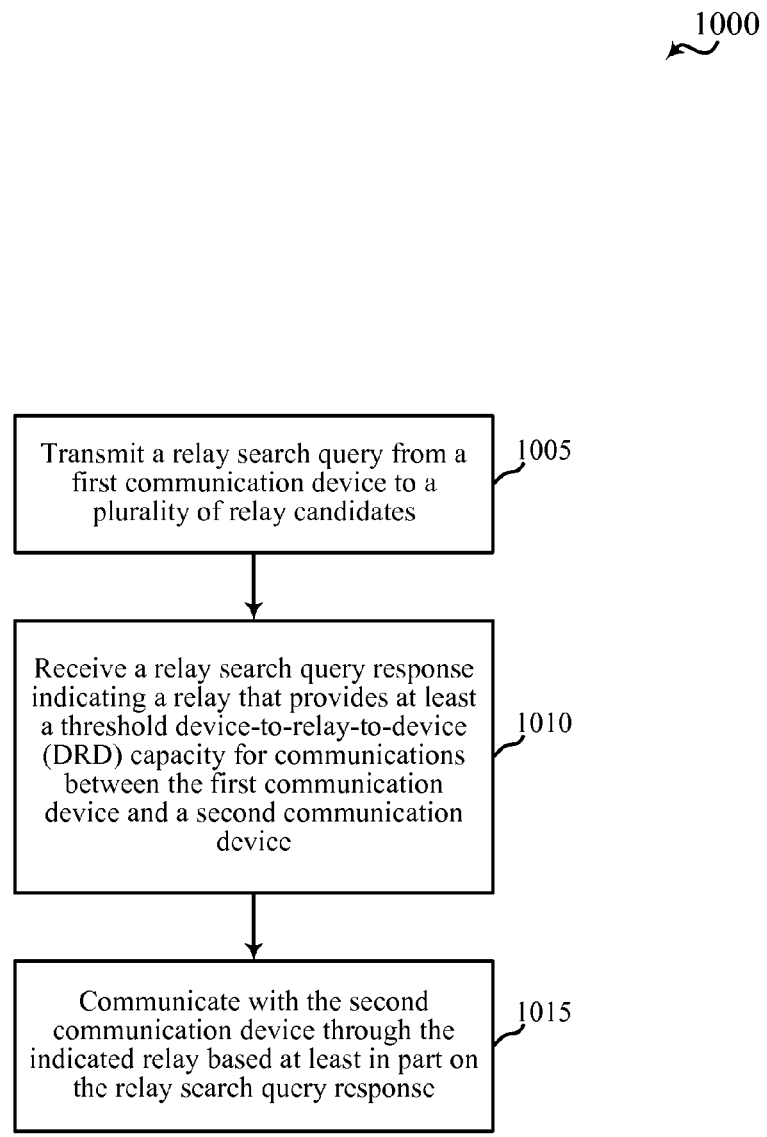
FIG. 10 is a flow chart illustrating an example of a method for wireless communication at a communication device, in accordance with various aspects of the present disclosure.

FIG. 10 is a flow chart illustrating an example of a method 1000 for wireless communication at a communication device, in accordance with various aspects of the present disclosure. For clarity, the method 1000 is described below with reference to aspects of one or more of the communication devices 115 described with reference to FIG. 1, 2, 4, 5, or 6 and the plurality of relay candidates 135 described with reference to FIG. 1 or 2. In some examples, a communication device may execute one or more sets of codes to control the functional elements of the communication device to perform the functions described below.

At block 1005, a first communication device may transmit a relay search query to a plurality of relay candidates. In some examples, the relay search query may identify a second communication device with which the first communication device desires to communicate. The operation(s) at block 1005 may be performed using the wireless communication management module 420 or relay search query module 435 described with reference to FIG. 4, 5, or 6.

At block 1010, the first communication device may receive a relay search query response indicating a relay that provides at least a threshold DRD capacity for communications between the first communication device and a second communication device. The operation(s) at block 1010 may be performed using the wireless communication management module 420 or relay search query response processing module 440 described with reference to FIG. 4, 5, or 6.

At block 1015, the first communication device may communicate with the second communication device, through the indicated relay, based at least in part on the relay search query response. The operation(s) at block 1015 may be performed using the wireless communication management module 420 or relay communication module 445 described with reference to FIG. 4, 5, or 6.

Thus, the method 1000 may provide for wireless communication. It should be noted that the method 1000 is just one implementation and that the operations of the method 1000 may be rearranged or otherwise modified such that other implementations are possible.

Figure 11:
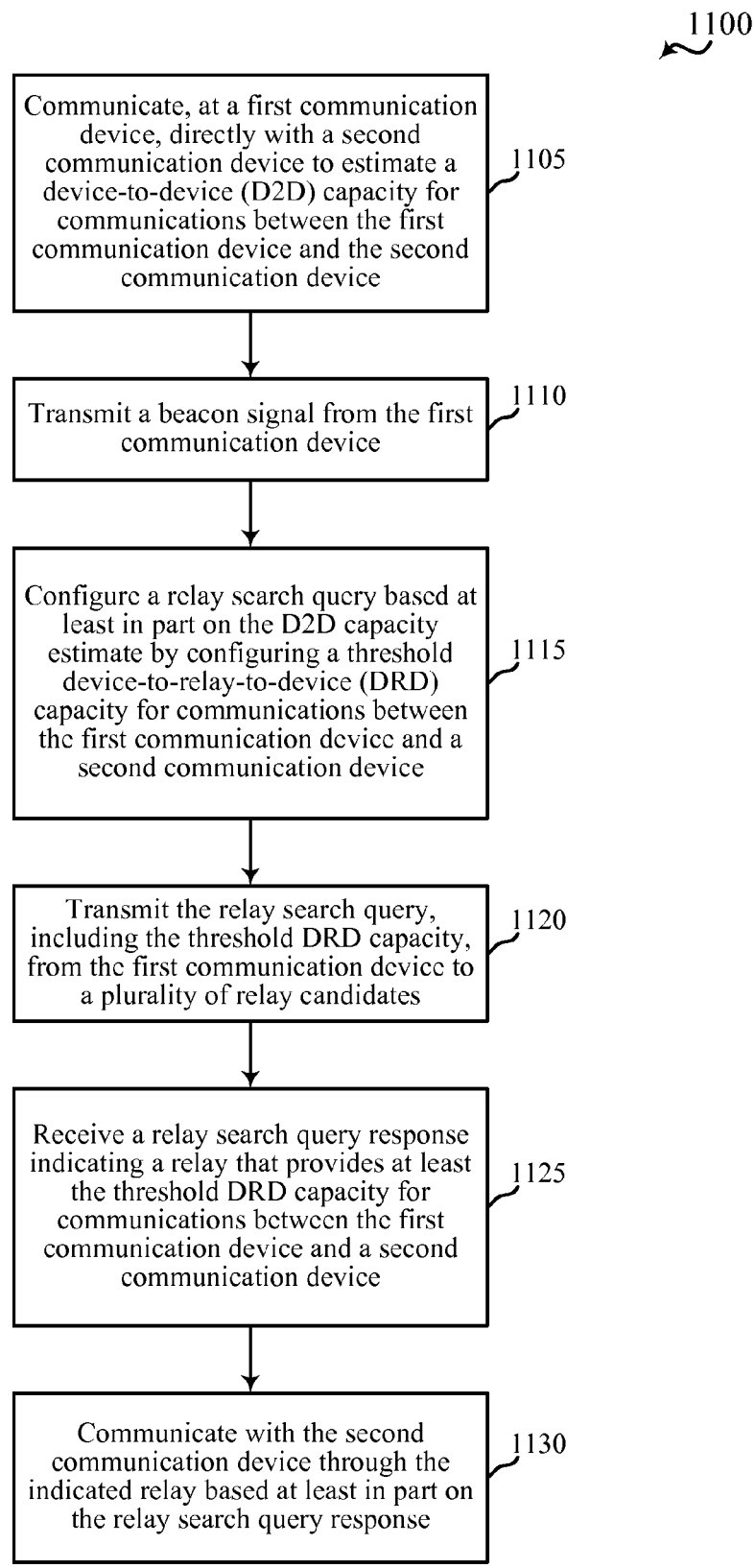
FIG. 11 is a flow chart illustrating an example of a method for wireless communication at a communication device, in accordance with various aspects of the present disclosure.

FIG. 11 is a flow chart illustrating an example of a method 1100 for wireless communication at a communication device, in accordance with various aspects of the present disclosure. For clarity, the method 1100 is described below with reference to aspects of one or more of the communication devices 115 described with reference to FIG. 1, 2, 4, 5, or 6, and the plurality of relay candidates 135 described with reference to FIG. 1 or 2. In some examples, a communication device may execute one or more sets of codes to control the functional elements of the communication device to perform the functions described below.

At block 1105, a first communication device may communicate directly with a second communication device to estimate a D2D capacity for communications between the first communication device and the second communication device. The operation(s) at block 1105 may be performed using the wireless communication management module 420 described with reference to FIG. 4, 5, or 6, or the D2D capacity estimation module 505 described with reference to FIG. 5 or 6.

At block 1110, the first communication device may transmit a beacon signal. In some examples, the beacon signal may be transmitted over a time-frequency resource (or resources) that differ(s) from the time-frequency resources used by other communication devices for beacon signal transmission. The beacon signal may be transmitted at a nominal power, to enable each of a plurality of relay candidates to estimate a pathloss from the first communication device to a respective one of the relay candidates. The operation(s) at block 1110 may be performed using the wireless communication management module 420 described with reference to FIG. 4, 5, or 6, or the beacon signal transmission module 510 described with reference to FIG. 5 or 6.

At block 1115, the first communication device may configure a relay search query based at least in part on the D2D capacity estimate. In some examples, configuring the relay search query based at least in part on the D2D capacity estimate may include configuring a threshold DRD capacity for communications between the first communication device and the second communication device. In some examples, configuring the threshold DRD capacity may include setting the threshold DRD capacity to be greater than the D2D capacity estimate. The operation(s) at block 1115 may be performed using the wireless communication management module 420 described with reference to FIG. 4, 5, or 6, or the relay search query configuration module 515 described with reference to FIG. 5 or 6.

At block 1120, the first communication device may transmit the relay search query to a plurality of relay candidates. In some examples, the relay search query may identify the second communication device. In some examples, the relay search query may communicate the threshold DRD capacity to the plurality of relay candidates. The operation(s) at block 1120 may be performed using the wireless communication management module 420 or relay search query module 435 described with reference to FIG. 4, 5, or 6.

At block 1125, the first communication device may receive a relay search query response indicating a relay that provides at least the threshold DRD capacity for communications between the first communication device and a second communication device. The operation(s) at block 1125 may be performed using the wireless communication management module 420 or relay search query response processing module 440 described with reference to FIG. 4, 5, or 6.

At block 1130, the first communication device may communicate with the second communication device, through the indicated relay, based at least in part on the relay search query response. The operation(s) at block 1130 may be performed using the wireless communication management module 420 or relay communication module 445 described with reference to FIG. 4, 5, or 6.

Thus, the method 1100 may provide for wireless communication. It should be noted that the method 1100 is just one implementation and that the operations of the method 1100 may be rearranged or otherwise modified such that other implementations are possible.

Figure 12:
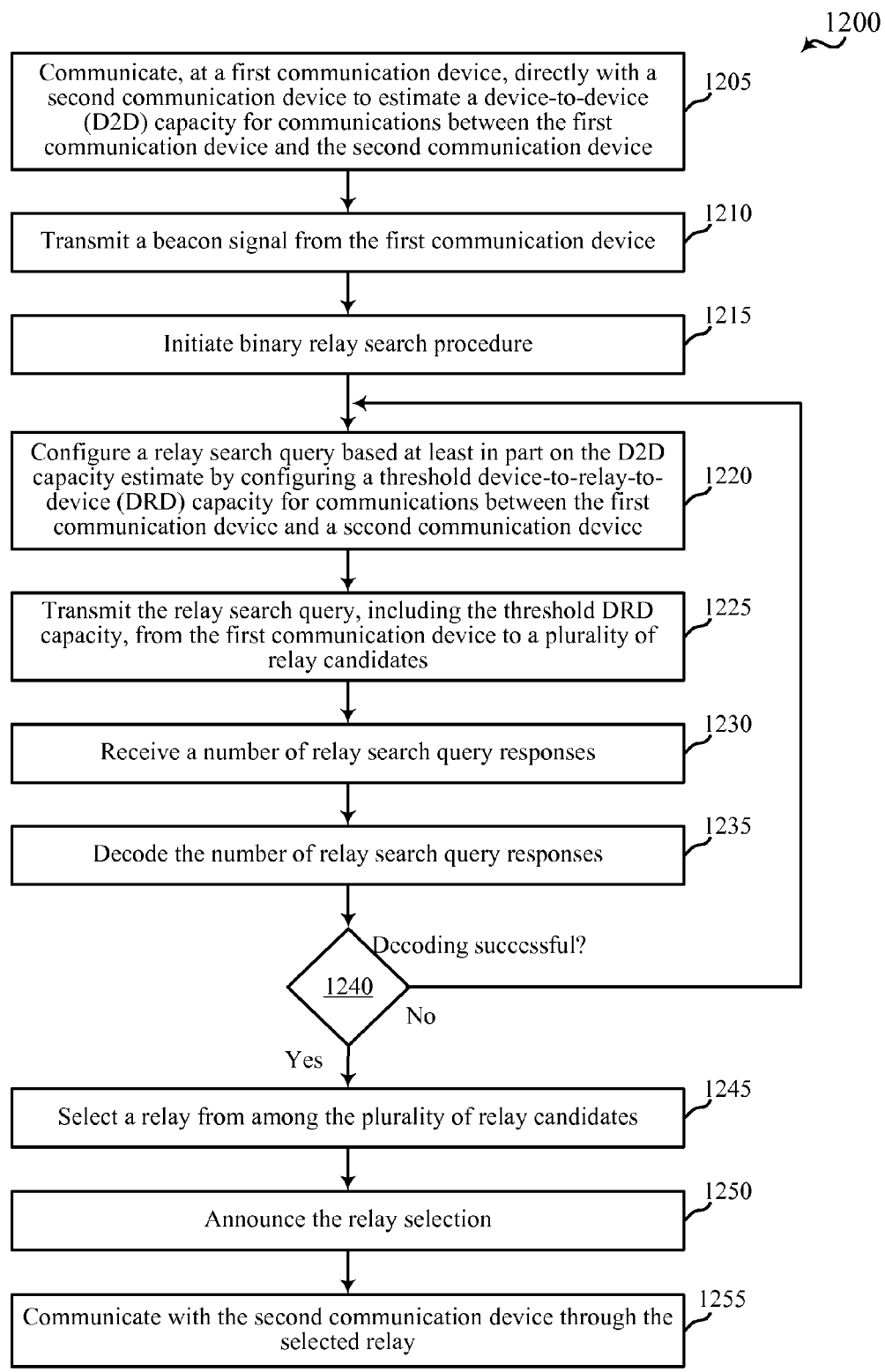
FIG. 12 is a flow chart illustrating an example of a method for wireless communication at a communication device, in accordance with various aspects of the present disclosure.

FIG. 12 is a flow chart illustrating an example of a method 1200 for wireless communication at a communication device, in accordance with various aspects of the present disclosure. For clarity, the method 1200 is described below with reference to aspects of one or more of the communication devices 115 described with reference to FIG. 1, 2, 4, 5, or 6, and the plurality of relay candidates 135 described with reference to FIG. 1 or 2. In some examples, a communication device may execute one or more sets of codes to control the functional elements of the communication device to perform the functions described below.

At block 1205, a first communication device may communicate directly with a second communication device to estimate a D2D capacity ($C_S$) for communications between the first communication device and the second communication device. Alternatively, the first communication device may communicate with the second communication device through a relay to estimate an existing relay-assisted capacity ($C_S$) for communications between the first communication device and the second communication device. The operation(s) at block 1205 may be performed using the wireless communication management module 420 described with reference to FIG. 4, 5, or 6, or the D2D capacity estimation module 505 described with reference to FIG. 5 or 6.

At block 1210, the first communication device may transmit a beacon signal. In some examples, the beacon signal may be transmitted over a time-frequency resource (or resources) that differ(s) from the time-frequency resources used by other communication devices for beacon signal transmission. The beacon signal may be transmitted at a nominal power, to enable each of a plurality of relay candidates to estimate a pathloss from the first communication device to a respective one of the relay candidates. The operation(s) at block 1210 may be performed using the wireless communication management module 420 described with reference to FIG. 4, 5, or 6, or the beacon signal transmission module 510 described with reference to FIG. 5 or 6.

At block 1215, the first communication device may initiate a binary relay search procedure. The operation(s) at block 1215 may be performed using the wireless communication management module 420 described with reference to FIG. 4, 5, or 6, or the binary relay search module 605 described with reference to FIG. 6.

At block 1220, the first communication device may configure a relay search query based at least in part on the D2D capacity estimate, relay-assisted capacity, and/or a prior threshold DRD capacity. In some examples, configuring the relay search query based at least in part on the D2D capacity estimate or prior threshold DRD capacity may include configuring a threshold DRD capacity for communications between the first communication device and the second communication device. In some examples, configuring the threshold DRD capacity may include setting the threshold DRD capacity to be the same or different than (e.g., greater than (e.g., 10× greater than) the D2D capacity estimate or relay-assisted capacity ($C_S$)), or different than (e.g., greater than (e.g. 2× greater than)) the prior threshold DRD capacity. The operation(s) at block 1220 may be performed using the wireless communication management module 420 described with reference to FIG. 4, 5, or 6, or the relay search query configuration module 515 described with reference to FIG. 5 or 6.

At block 1225, the first communication device may transmit the relay search query to a plurality of relay candidates. In some examples, the relay search query may identify the second communication device. In some examples, the relay search query may communicate the threshold DRD capacity configured at block 1220 to the plurality of relay candidates. The operation(s) at block 1225 may be performed using the wireless communication management module 420 or relay search query module 435 described with reference to FIG. 4, 5, or 6.

At block 1230, the first communication device may receive a number of relay search query responses. In some cases, the number of relay search query responses may include a single relay search query response indicating a relay candidate that provides at least the threshold DRD capacity. In other cases, the plurality of relay search query responses may indicate a subset of the relay candidates that provide at least the threshold DRD capacity. In still other cases, no relay search query response may be received, in which case the method 1200 may return to block 1220 for the configuration of a new threshold DRD capacity (e.g., a threshold DRD capacity that is ½ the prior threshold DRD capacity). The operation(s) at block 1230 may be performed using the wireless communication management module 420 or relay search query response processing module 440 described with reference to FIG. 4, 5, or 6.

At block 1235, the first communication device may decode the number of relay search query responses. Decoding a relay search query response may include extracting a DRD capacity estimate for a respective relay candidate in the plurality of relay candidates. In some examples, the DRD capacity estimate may be indicated by a ratio between the DRD capacity estimate ($C_R$) and the threshold DRD capacity. When it is determined, at block 1240, that the decoding is successful, the method 1200 may proceed to block 1245. When it is determined, at block 1240, that there exists a failure to decode a relay search query response, the method 1200 may proceed to block 1220. The operation(s) at block 1235 and 1240 may be performed using the wireless communication management module 420 or relay search query response processing module 440 described with reference to FIG. 4, 5, or 6, or the relay search query response decoding module 610 described with reference to FIG. 6.

At block 1245, the first communication device may select a relay from among the plurality of relay candidates. When the number of relay search query responses includes a single relay search query response, a relay candidate indicated by the relay search query response may be selected. When the number of relay search query responses includes a plurality of relay search query responses, a relay candidate associated with a greatest DRD capacity estimate may be selected. The operation(s) at block 1245 may be performed using the wireless communication management module 420 described with reference to FIG. 4, 5, or 6, or the relay selection module 615 described with reference to FIG. 6.

At block 1250, the first communication device may announce its relay selection. In some examples, the announcement may be made in a broadcast announcement.

In other examples, the announcement may be made in one or more transmissions to the selected relay and/or the second communication device. The operation(s) at block 1250 may be performed using the wireless communication management module 420 described with reference to FIG. 4, 5, or 6, or the relay selection announcement module 620 described with reference to FIG. 6.

At block 1255, the first communication device may communicate with the second communication device through the selected relay. The operation(s) at block 1255 may be performed using the wireless communication management module 420 or relay communication module 445 described with reference to FIG. 4, 5, or 6.

In some embodiments, the loop including blocks 1220, 1225, 1230, 1235, and 1240 may be repeated for a fixed number of iterations, and upon failure to decode the number of relay search query responses during a final iteration, no relay may be selected. The selection of a relay may also be skipped when the maximum ratio of $C_R/C_S < C_S$.

Thus, the method 1200 may provide for wireless communication. It should be noted that the method 1200 is just one implementation and that the operations of the method 1200 may be rearranged or otherwise modified such that other implementations are possible.

In some embodiments, aspects of the methods 1000, 1100, or 1200 described with reference to FIG. 10, 11, or 12 may be combined.

Figure 13:
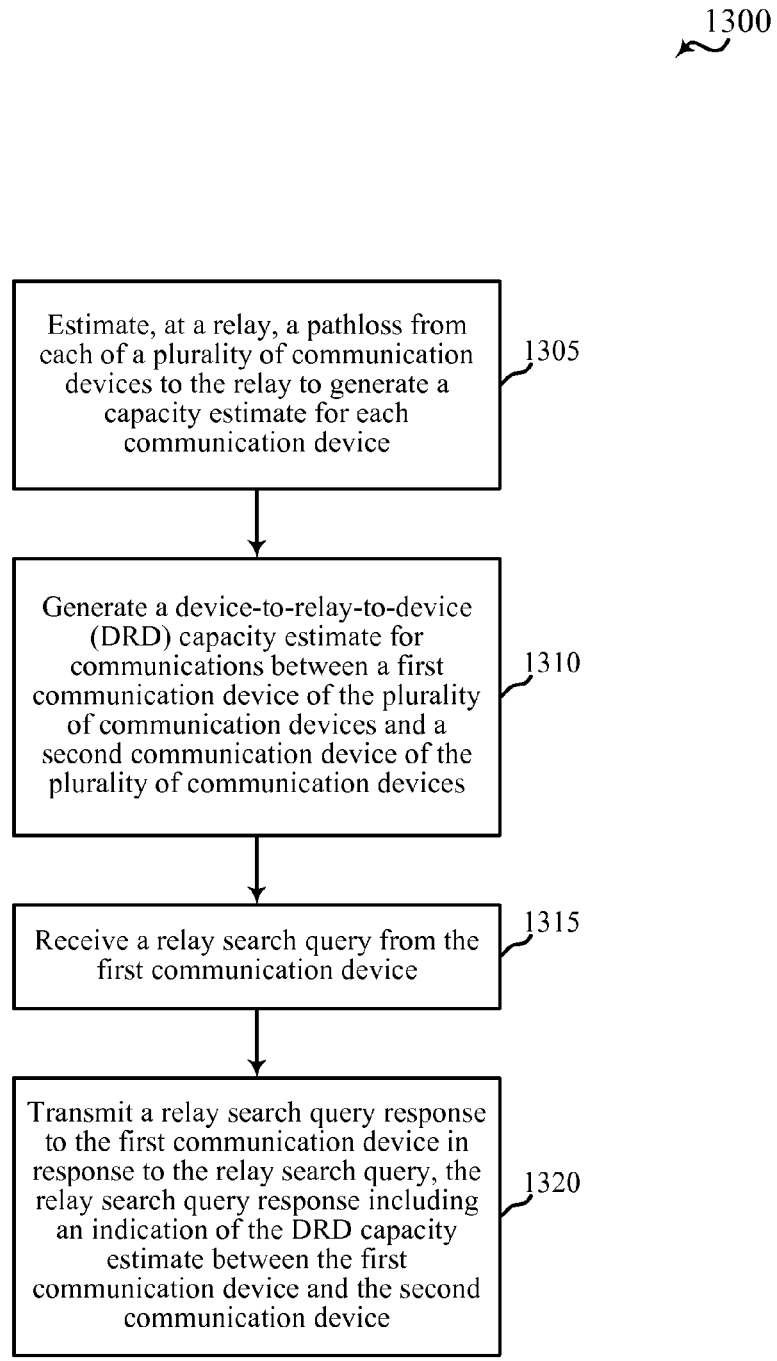
FIG. 13 is a flow chart illustrating an example of a method for wireless communication at a communication device, in accordance with various aspects of the present disclosure.

FIG. 13 is a flow chart illustrating an example of a method 1300 for wireless communication at a communication device, in accordance with various aspects of the present disclosure. For clarity, the method 1300 is described below with reference to aspects of one or more of the relay candidates described with reference to FIG. 1, 2, 7, or 8, or aspects of one or more of the communication devices 115 described with reference to FIG. 1, 2, 4, 5, or 6. In some examples, a relay candidate may execute one or more sets of codes to control the functional elements of the relay candidate to perform the functions described below.

At block 1305, a relay may estimate a pathloss from each of a plurality of communication devices, to the relay, to generate a capacity estimate for each communication device. In some cases, the communication devices may include source communication devices and destination communication devices. The operation(s) at block 1305 may be performed using the wireless communication management module 720 or DR capacity estimate generation module 735 described with reference to FIG. 7 or 8.

At block 1310, the relay may generate a DRD capacity estimate for communications between a first communication device and a second communication device of the plurality of communication devices. In some examples, the relay may generate a DRD capacity estimate for communications between each known or potential pairing of source and destination communication devices. Each DRD capacity estimate may be based at least in part on a first capacity estimate for a source communication device to the relay and a second capacity estimate for a destination communication device to the relay. The operation(s) at block 1310 may be performed using the wireless communication management module 720 or DRD capacity estimate generation module 740 described with reference to FIG. 7 or 8.

At block 1315, the relay may receive a relay search query from the first communication device. The operation(s) at block 1315 may be performed using the wireless communication management module 720 or relay search query processing module 745 described with reference to FIG. 7 or 8.

At block 1320, the relay may transmit a relay search query response to the first communication device, in response to the relay search query. The relay search query response may include an indication of the DRD capacity estimate between the first communication device and the second communication device. The operation(s) at block 1320 may be performed using the wireless communication management module 720 or relay search query response module 750 described with reference to FIG. 7 or 8.

Thus, the method 1300 may provide for wireless communication. It should be noted that the method 1300 is just one implementation and that the operations of the method 1300 may be rearranged or otherwise modified such that other implementations are possible.

Figure 14:
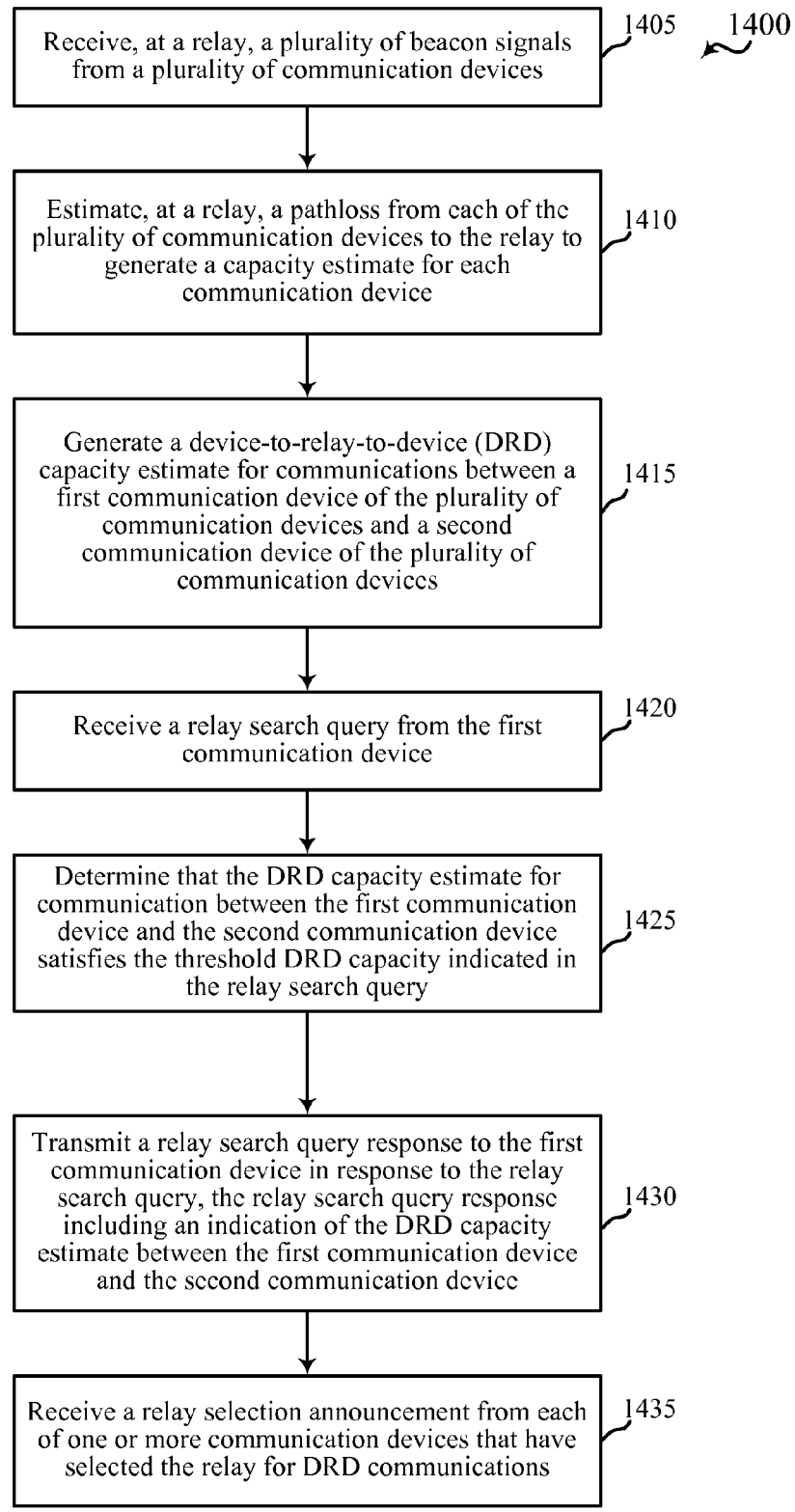
FIG. 14 is a flow chart illustrating an example of a method for wireless communication at a communication device, in accordance with various aspects of the present disclosure.

FIG. 14 is a flow chart illustrating an example of a method 1400 for wireless communication at a communication device, in accordance with various aspects of the present disclosure. For clarity, the method 1400 is described below with reference to aspects of one or more of the relay candidates described with reference to FIG. 1, 2, 7, or 8, or aspects of one or more of the communication devices 115 described with reference to FIG. 1, 2, 4, 5, or 6. In some examples, a relay candidate may execute one or more sets of codes to control the functional elements of the relay candidate to perform the functions described below.

At block 1405, a relay may receive a plurality of beacon signals from a plurality of communication devices. In some cases, the communication devices may include source communication devices and destination communication devices. In some examples, each of the plurality of beacon signals may be received over a different time-frequency resource (or resources). Each beacon signal may be transmitted at a nominal power, to enable the relay to estimate a pathloss from each of the plurality of communication devices to the relay. The operation(s) at block 1405 may be performed using the wireless communication management module 720 described with reference to FIG. 7 or 8, or the beacon signal reception module 805 described with reference to FIG. 8.

At block 1410, the relay may estimate a pathloss from each of the plurality of communication devices, to the relay, to generate a capacity estimate for each communication device. In some examples, the relay may estimate the pathloss from each of the plurality of communication devices to the relay based at least in part on the plurality of beacon signals (e.g., based on measurements (e.g., measured signal strengths) of the beacon signals, which may be compared to the nominal power of the beacon signals). The operation(s) at block 1410 may be performed using the wireless communication management module 720 or DR capacity estimate generation module 735 described with reference to FIG. 7 or 8.

At block 1415, the relay may generate a DRD capacity estimate ($C_R$) for communications between a first communication device and a second communication device of the plurality of communication devices. In some examples, the relay may generate a DRD capacity estimate for communications between each known or potential pairing of source and destination communication devices. Each DRD capacity estimate may be based at least in part on a first capacity estimate for a source communication device to the relay and a second capacity estimate for a destination communication device to the relay. The operation(s) at block 1415 may be performed using the wireless communication management module 720 or DRD capacity estimate generation module 740 described with reference to FIG. 7 or 8.

At block 1420, the relay may receive a relay search query from the first communication device. In some examples, the relay search query may indicate a threshold DRD capacity. In some examples, the relay search query may identify the second communication device. The operation(s) at block 1420 may be performed using the wireless communication management module 720 or relay search query processing module 745 described with reference to FIG. 7 or 8.

At block 1425, the relay may determine that the DRD capacity estimate for communication between the first communication device and the second communication device satisfies the threshold DRD capacity indicated in the relay search query. When the DRD capacity estimate satisfies the threshold DRD capacity, the method 1400 may continue at block 1430. When the DRD capacity estimate does not satisfy the threshold DRD capacity, the relay may wait until a next relay selection period and return to block 1405. The operation(s) at block 1425 may be performed using the wireless communication management module 720 or relay search query processing module 745 described with reference to FIG. 7 or 8, or the DRD capacity comparison module 810 described with reference to FIG. 8.

At block 1430, the relay may transmit a relay search query response to the first communication device, based at least in part on the determination made at block 1425. The relay search query response may include an indication of the DRD capacity estimate between the first communication device and the second communication device. In some examples, the indication of the DRD capacity estimate may include a ratio between the DRD capacity estimate and the threshold DRD capacity. The operation(s) at block 1430 may be performed using the wireless communication management module 720 or relay search query response module 750 described with reference to FIG. 7 or 8.

At block 1435, the relay may receive a relay selection announcement from each of one or more communication devices that have selected the relay for DRD communications. In some cases, a relay selection announcement may be received from a source communication device. In some cases, a relay selection announcement may be received from a destination communication device. The operation(s) at block 1435 may be performed using the wireless communication management module 720 described with reference to FIG. 7 or 8, or the relay status module 815 described with reference to FIG. 8.

Thus, the method 1400 may provide for wireless communication. It should be noted that the method 1400 is just one implementation and that the operations of the method 1400 may be rearranged or otherwise modified such that other implementations are possible.

In some embodiments, aspects of the methods 1300 and 1400 described with reference to FIGS. 13 and 14 may be combined.

The detailed description set forth above in connection with the appended drawings describes exemplary embodiments and does not represent all embodiments that may be implemented or that are within the scope of the claims. The term "example" or "exemplary," when used in this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable ROM (EEPROM), compact disk (CD)-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, comprising:
   transmitting, from a first communication device, a relay search query to a plurality of relay candidates, the relay search query identifying a second communication device for communication with the first device;
   receiving a relay search query response indicating a relay that provides at least a threshold device-to-relay-to-device (DRD) capacity for communications between the first communication device and the second communication device; and
   communicating with the second communication device through the indicated relay based at least in part on the relay search query response;
   wherein the relay search query communicates the threshold DRD capacity to the plurality of relay candidates.

2. The method of claim 1, further comprising:
   transmitting a beacon signal from the first communication device, wherein the beacon signal is transmitted at a nominal power to enable each of the plurality of relay candidates to estimate a pathloss from the first communication device to a respective one of the plurality of relay candidates.

3. The method of claim 1, further comprising:
   communicating directly with the second communication device to estimate a device-to-device (D2D) capacity for communications between the first communication device and the second communication device; and
   configuring the relay search query based at least in part on the D2D capacity estimate.

4. The method of claim 3, wherein the threshold DRD capacity communicated by the relay search query is greater than the estimated D2D capacity.

5. The method of claim 1, wherein the relay search query comprises a second relay search query transmitted in response to a failure to decode a response to a first relay search query, the second relay search query communicating a different threshold DRD capacity than the first relay search query.

6. The method of claim 1, wherein receiving the relay search query response comprises:
   receiving a plurality of relay search query responses indicating a subset of the plurality of relay candidates that provide at least the threshold DRD capacity; and
   selecting the relay from the subset of the plurality of relay candidates.

7. The method of claim 6, wherein the plurality of relay search query responses comprise a DRD capacity estimate for each relay candidate in the subset of the plurality of relay candidates; and
   wherein selecting the relay comprises selecting the relay candidate associated with a greatest DRD capacity estimate.

8. A method for wireless communication, comprising:
   transmitting, from a first communication device, a relay search query to a plurality of relay candidates, the relay search query identifying a second communication device for communication with the first device;
   receiving a plurality of relay search query responses indicating a subset of the plurality of relay candidates that provide at least a threshold device-to-relay-to-device (DRD) capacity for communications between the first communication device and the second communication device, each of the plurality of relay search query responses comprising a DRD capacity estimate for each relay candidate in the subset of relay candidates;
   selecting the relay associated with a greatest DRD capacity estimate from the subset of the plurality of relay candidates; and
   communicating with the second communication device through the selected relay based at least in part on the plurality of relay search query responses,
   wherein the DRD capacity estimate for each relay candidate is based at least in part on a first device-to-relay (DR) capacity estimate for the first communication device to the each relay candidate and a second DR capacity estimate for the second communication device to the each relay candidate.

9. An apparatus for wireless communication, comprising:
   a processor;
   memory in electronic communication with the processor; and
   instructions stored in the memory, the instructions being executable by the processor to:
   transmit, from a first communication device, a relay search query to a plurality of relay candidates, the relay search query identifying a second communication device for communication with the first communication device;
   receive a relay search query response indicating a relay that provides at least a threshold device-to-relay-to-device (DRD) capacity for communications between the first communication device and the second communication device; and
   communicate with the second communication device through the indicated relay based at least in part on the relay search query response,
   wherein the relay search query communicates the threshold DRD capacity to the plurality of relay candidates.

10. The apparatus of claim 9, wherein the instructions are executable by the processor to:
    transmit a beacon signal from the first communication device, wherein the beacon signal is transmitted at a nominal power to enable each of the plurality of relay candidates to estimate a pathloss from the first communication device to a respective one of the plurality of relay candidates.

11. The apparatus of claim 10, wherein the instructions are executable by the processor to:
    communicate directly with the second communication device to estimate a device-to-device (D2D) capacity for communications between the first communication device and the second communication device; and
    configure the relay search query based at least in part on the D2D capacity estimate.

12. The apparatus of claim 11, wherein the threshold DRD capacity communicated by the relay search query is greater than the estimated D2D capacity.

13. The apparatus of claim 9, wherein the relay search query comprises a second relay search query transmitted in response to a failure to decode a response to a first relay search query, the second relay search query communicating a different threshold DRD capacity than the first relay search query.

14. The apparatus of claim 9, wherein the instructions executable by the processor to receive the relay search query response comprise instructions executable by the processor to:
receive a plurality of relay search query responses indicating a subset of the plurality of relay candidates that provide at least the threshold DRD capacity; and
select the relay from the subset of the plurality of relay candidates.

15. The apparatus of claim 14, wherein the plurality of relay search query responses comprise a DRD capacity estimate for each relay candidate in the subset of the plurality of relay candidates; and
wherein the instructions executable by the processor to select the relay comprise instructions executable by the processor to select the relay candidate associated with a greatest DRD capacity estimate.

16. A method for wireless communication, comprising:
estimating, at a relay, a pathloss from each of a plurality of communication devices to the relay to generate a capacity estimate for each communication device;
generating a device-to-relay-to-device (DRD) capacity estimate for communications between a first communication device of the plurality of communication devices and a second communication device of the plurality of communication devices;
receiving a relay search query from the first communication device; and
transmitting a relay search query response to the first communication device in response to the relay search query, the relay search query response comprising an indication of the DRD capacity estimate between the first communication device and the second communication device.

17. The method of claim 16, wherein the relay search query indicates a threshold DRD capacity.

18. The method of claim 17, further comprising:
determining that the DRD capacity estimate for communications between the first communication device and the second communication device satisfies the threshold DRD capacity;
wherein the relay search query response is transmitted based at least in part on the determination.

19. The method of claim 18, wherein the indication of the DRD capacity estimate between the first communication device and the second communication device comprises a ratio between the DRD capacity estimate and the threshold DRD capacity.

20. The method of claim 16, further comprising:
receiving a plurality of beacon signals from the plurality of communication devices;
wherein the pathloss from each of the plurality of communication devices is based at least in part on one of the plurality of beacon signals.

21. The method of claim 20, wherein each of the plurality of beacon signals is received over a different time-frequency resource.

22. The method of claim 16, wherein the DRD capacity estimate is generated based at least in part on a first device-to-relay (DR) capacity estimate for the first communication device to the relay and a second DR capacity estimate for the second communication device to the relay.

23. An apparatus for wireless communication, comprising:
a processor;
memory in electronic communication with the processor; and
instructions stored in the memory, the instructions being executable by the processor to:
estimate, at a relay, a pathloss from each of a plurality of communication devices to the relay to generate a capacity estimate for each communication device;
generate a device-to-relay-to-device (DRD) capacity estimate for communications between a first communication device of the plurality of communication devices and a second communication device of the plurality of communication devices;
receive a relay search query from the first communication device; and
transmit a relay search query response to the first communication device in response to the relay search query, the relay search query response comprising an indication of the DRD capacity estimate between the first communication device and the second communication device.

24. The apparatus of claim 23, wherein the relay search query indicates a threshold DRD capacity.

25. The apparatus of claim 24, wherein the instructions are executable by the processor to:
determine that the DRD capacity estimate for communications between the first communication device and the second communication device satisfies the threshold DRD capacity;
wherein the relay search query response is transmitted based at least in part on the determination.

26. The apparatus of claim 25, wherein the indication of the DRD capacity estimate between the first communication device and the second communication device comprises a ratio between the DRD capacity estimate and the threshold DRD capacity.

27. The apparatus of claim 23, wherein the instructions are executable by the processor to:
receive a plurality of beacon signals from the plurality of communication devices;
wherein the pathloss from each of the plurality of communication devices is based at least in part on one of the plurality of beacon signals.

28. The apparatus of claim 27, wherein each of the plurality of beacon signals is received over a different time-frequency resource.

* * * * *